United States Patent [19]

Nagashima

[11] Patent Number: 4,907,171
[45] Date of Patent: Mar. 6, 1990

[54] IMAGE SIZE CONVERTER
[75] Inventor: Takashi Nagashima, Tokyo, Japan
[73] Assignee: Kabushiki Kaisha Toshiba, Kawasaki, Japan
[21] Appl. No.: 31,038
[22] Filed: Mar. 27, 1987
[30] Foreign Application Priority Data Mar. 28, 1986 [JP] Japan .................................. 61-68710

[51] Int. Cl.⁴ ............................................. G06F 15/66
[52] U.S. Cl. .................................... 364/518; 340/731; 358/451
[58] Field of Search ................... 364/518, 521, 710.01, 364/715.01, 715.02; 340/728, 731; 358/77, 287; 382/42

[56] References Cited

U.S. PATENT DOCUMENTS

| 4,054,914 | 10/1977 | Fukuoka | 358/287 X |
| 4,468,755 | 8/1984 | Iida | 358/287 X |
| 4,532,602 | 7/1985 | DuVall | 340/731 X |
| 4,587,621 | 5/1986 | DuVall | 364/521 X |
| 4,672,680 | 6/1987 | Middleton | 364/521 X |
| 4,712,185 | 12/1987 | Aoki | 364/521 X |
| 4,736,438 | 4/1988 | Persoon et al. | 382/42 X |
| 4,799,173 | 1/1989 | Rose et al. | 364/518 |

Primary Examiner—Gary V. Harkcom
Assistant Examiner—Mark K. Zimmerman
Attorney, Agent, or Firm—Finnegan, Henderson, Farabow, Garrett and Dunner

[57] ABSTRACT

An image size converter includes X1 through X4 value generators for respectively generating X1 through X4 values of an image size, first through fourth adders each of which receives a corresponding one of the X1 through X4 values from the X1 through X4 generators at one input thereof, a register for storing at least a decimal part of the said fourth adder and supplying the decimal part to the other input of each of said first through fourth adders, first through third exclusive ORs for detecting noncoincidence between at least the least significant bits of the integer parts of the sums from the second through fourth adders and of the first through third adders, and a size conversion data generator for receiving an image size conversion object dot pattern input in units of 4 bits and determining correspondence between the 4-bit input dot pattern and the first through 4-bit output dot patterns on the basis of the least significant bit of the integer part of the sum of the first adder, and a detection result of said the first through third exclusive ORs.

51 Claims, 12 Drawing Sheets

FIG. 4

| BIT PATTERN OF CARRY SIGNALS | CODE OF THE NUMBER OF CARRY SIGNALS |
|:---:|:---:|
| 0 0 0 0 | 0 0 0 |
| 0 0 0 1 | 0 0 1 |
| 0 0 1 0 | 0 0 1 |
| 0 0 1 1 | 0 1 0 |
| 0 1 0 0 | 0 0 1 |
| 0 1 0 1 | 0 1 0 |
| 0 1 1 0 | 0 1 0 |
| 0 1 1 1 | 0 1 1 |
| 1 0 0 0 | 0 0 1 |
| 1 0 0 1 | 0 1 0 |
| 1 0 1 0 | 0 1 0 |
| 1 0 1 1 | 0 1 1 |
| 1 1 0 0 | 0 1 0 |
| 1 1 0 1 | 0 1 1 |
| 1 1 1 0 | 0 1 1 |
| 1 1 1 1 | 1 0 0 |

IMAGE SIZE CONVERTER

BACKGROUND OF THE INVENTION

The present invention relates to an image size converter for reducing or enlarging image data.

A conventional image size converter such as that shown in FIG. 1 includes a Digital Differential Analyzer (DDA). The DDA is a known circuit for generating coordinate values from an initial scale value and an increment scale value. The DDA includes adder 14, scale register 15 in which a reduction or enlargement ratio of an image size is set, and accumulator 16 in which "0" is set as an initial value and then a decimal part is set.

The image size converter also includes logic circuitry connecting the DDA to a source register 11 and a conversion pattern register 13. AND gate 1 gates a carry signal from adder 14 during reduction of the image in the reduction mode, and AND gate 2 gates a carry signal from adder 14 during enlargement of the image in the enlargement mode. The logic circuitry also includes OR gate 4 for continuously supplying a shift signal to source shift register 11 (to be described later) in the reduction mode, OR gate 3 for continuously supplying a shift signal to destination register 13 in the enlargement mode, and AND gates 6 and 5 for gating the shift signals from OR gates 4 and 3, respectively. Source shift register 11 stores image data, data generator 12 (e.g., OR gates) receives an image dot pattern from register 11 and generates an image data pattern representing an enlarged or reduced image dot pattern, and destination register 13 stores image data output from data generator 12.

In order to reduce image data in the circuit of FIG. 1, image data output from source shift register 11 in units of dots is extracted (or logically ORed) by data generator 12 at a predetermined rate. Image enlargement is performed by copying the same image data to destination shift register 11 until a significant carry signal is supplied thereto. Image data enlargement and reduction in the conventional image size converter will be described below. It should be noted that the circuit in FIG. 1 is operated according to the normal logic, i.e., active high.

To understand the operation of the system of FIG. 1 in the reduction mode, assume that the image size is to be reduced to ⅓. In this case, value "⅓" is set in scale register 15, and "0" is set as the initial value in accumulator 16. Adder 14 adds "0" and "⅓" and feeds back the sum "⅓" to accumulator 16. The first addition does not cause generation of a carry signal. In the second addition, "⅓" in accumulator 16 is added to "⅓" in scale register 15, so that the resultant sum is "⅔". As is apparent from the resultant sum, no carry signal is generated. In the third addition, "⅔" in the accumulator 16 is added to "⅓" in scale register 15, and the resultant sum is "1". In this case, a carry from the decimal part to the integer part occurs, and a significant carry signal is output. Since the addition result represents "1" (="3/3"), the decimal part is "0", and "0" is set again in accumulator 16. The above operations are then repeated. When the scale is set to be ⅓, adder 14 generates a significant (logic "1") carry signal "1" for every three additions. More specifically, adder 14 sequentially generates logic "0", logic "0", logic "1", logic "0", logic "0", logic "1", etc. In the first addition output from adder 14, a carry signal of logic "0" is supplied to AND gate 1, and at the same time a reduction mode signal of logic "1" is supplied to AND gate 1. The reduction mode signal of logic "1" is also supplied to OR gate 4. OR gate 4 continuously supplies signals of high level to AND gate 6, and thus AND gate 6 supplies the shift signal to source shift register 11 in response to the clock signal. Register 11 outputs 1-bit at a time of an image dot pattern in response to the clock signal. Data generator 12 ORs the 1-bit output with the most significant fit (MSB) of register 11, and supplies the OR product to register 13. Register 13 stores the OR product and feeds it back to generator 12. The above operation is repeated in correspondence with the clock signal.

At the same time AND gate 1 receives a carry signal of logic "0", and AND Gate 5 does not supply the shift signal to destination register 13 since the signal output from OR gate 3 is set at logic "0". In the second addition, no carry occurs from the decimal part to the integer part, and the same operation as in the first addition is performed. In the third addition, a significant (logic "1") carry signal is output from adder 14. The carry signal of logic "1" is supplied to AND gate 5 through OR gate 3. AND gate 5 supplies the shift signal (i.e., the carry signal of logic "1") to destination register 13 at the clock signal, and the contents of register 13 are shifted by one bit. In this state, a 3-bit image dot pattern from register 11 is logically ORed with each other by generator 12, and the result is held as the MSB of register 13. In this manner, the above operations are repeated to reduce the image data by ⅓.

In the enlargement mode, an enlargement signal of logic "1" is supplied to AND gate 2 and OR gate 3. OR gate 3 outputs a signal of logic "1" so that AND gate 5 supplies a clock signal to destination register 13. Register 13 performs shifting in correspondence with the clock signal. In the first addition, since the carry signal is set at logic "0", AND gate 2 generates this signal, i.e., a logic "0". The signal of logic "0" is supplied to AND gate 6 through OR gate 4, and AND gate 6 does not supply the clock signal to source register 11. Information is not shifted through register 11. An image dot from register 11 is supplied to data generator 12, and generator 12 supplies its data to register 13. The same operation as in the first addition is repeated in the second addition. In the third addition, since the carry signal of logic "1" is output, this signal is supplied to register 11 through AND gate 2, OR gate 4, and AND gate 6. As a result, register 11 is shifted by one bit, and the next image dot pattern is generated. In the case of 3× enlargement, register 13 is shifted three times while register 11 is shifted once. Therefore, the same image dot from register 11 is copied in register 13 three times.

As is apparent from the above description, reduction or enlargement in units of dots is performed in the conventional image size converter. For this reason, in industrial fields requiring high-speed image size conversion, e.g., in an image retrieval system connected to an optical disk, a long waiting time is required for an operator since the processing speed is very low.

SUMMARY OF THE INVENTION

It is an object of the present invention to provide an image size converter for performing image size reduction or enlargement of a plurality of parallel bits.

In order to achieve the above object of the present invention, there is provided an image size converter, for enlarging or reducing the image size in accordance with a scale value, comprising:

means for inputting the scale value to the image size converter;

means in response to the scale value for generating in parallel a plurality of carry signals;

means in response to the parallel output of the plurality of carry signals and to the input image size conversion object dot pattern data for producing an output dot pattern converted in accordance with the scale value.

BRIEF DESCRIPTION OF THE DRAWINGS

Other objects and features of the present invention will be apparent from the following description taken in connection with the accompanying drawings, in which:

FIG. 4 is a table of the-number-of-carries encoding circuit 41, showing conversion between the bit pattern of the carry signals and the code of the number of carry signals;

DETAILED DESCRIPTION OF THE PREFERRED EMBODIMENTS

Figure 2:
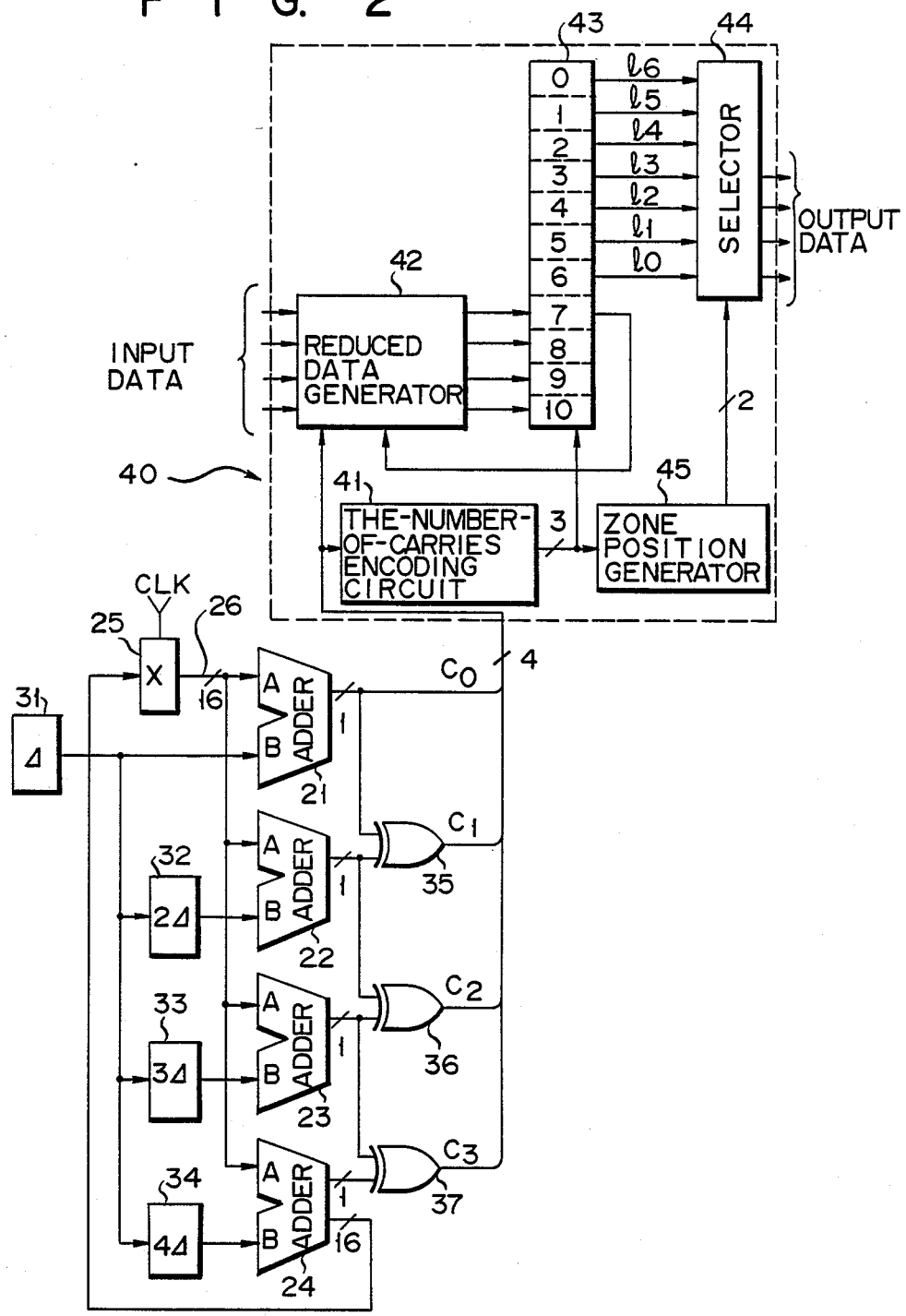
FIG. 2 is a block diagram of an image size reduction circuit as an image size converter according to a preferred embodiment of the present invention.

FIG. 2 is a block diagram of an image size reduction circuit used as an image size converter according to a preferred embodiment of the present invention. In accordance with the present invention a parallel carry signal generator 38 is used in place of a serial carry signal thereby allowing faster image size conversion. In this embodiment, first through fourth additions of scale values and accumulation values are simultaneously performed, although the number of additions does not limit the scope of the invention. Each of adders 21 through 24 has inputs A and B and adds data signals input to inputs A and B. Adders 21 through 23 generate 1-bit outputs of the integer parts (i.e., the lower bit of each integer part), and adder 24 generates a one-bit output of the integer part, and a 16-bit output as a decimal part. Accumulator 25 holds the 16-bit decimal part from adder 24. An accumulated value from accumulator 25 is commonly supplied to inputs A of adders 21 through 24. Scale register 31 comprises a 16-bit register for storing a designated reduction ratio. The reduction ratio is supplied from register 31 to input B of adder 21 and to 2X, 3X, and 4X value generators 32, 33, and 34. Generator 32 comprises a register in this embodiment. A value obtained by shifting the value of register 31 by one bit to the left is set in generator 32. Generator 33 comprises a register and adder. A value obtained by adding a scale register value to the 2X value shifted by one bit to the left is set in generator 33. A value obtained by shifting the scale register value by 2 bits to the left is set in generator 34. An output ($2\Delta$) from generator 32 is input to input B of adder 22. An output ($3\Delta$) from generator 33 is supplied to input B of adder 23. An output ($4\Delta$) from generator 34 is supplied to input B of adder 24.

Exclusive OR gate 35 detects a noncoincidence between one bit of the integral part from adder 21 and one bit of the integral part from adder 22. Exclusive OR gate 36 detects a noncoincidence between one bit of the integral part from adder 22 and one bit of the integer part from adder 23. Exclusive OR gate 37 detects a noncoincidence between a bit of the integer from adder 23 and one bit of the integral part of adder 24.

Image size reduction data generator 40 comprises reduced data generator 42, the-number-of-carries encoding circuit 41, output data register 43, zone position generator 45, and selector 44. Generator 40 receives 4-bit input data (i.e., an image size conversion object dot pattern) and determines correspondence (described below) between the 4-bit input data and output data on the basis of the one bit of the integer part C0 from adder 21 and the output signals (i.e., carry signals C1 through C3) from exclusive OR gates 35, 36 and 37. Encoding circuit 41 encodes carry signals C0 through C3 and generates a 3-bit carry code representing the number of carry signals. Generator 42 reduces the 4-bit input data responsive to the input of carry signals C0 through C3 and generates reduced data having a maximum of 4 bits. Register 43 comprises, as here embodied, an 11-bit register and holds output data from generator 42. The 7th through 10th bits of data from register 43 are used as input bits for output data from generator 42. The 0th through 6th bits of register 43 are used as output bits to selector 44. Register 43 has a barrel shift function having a maximum shift number of 4 bits. Before the output data from generator 42 is input to register 43, register 43 barrel shifts the storage contents by the number of carry signals represented by the code generated by encoding circuit 41.

The 7th bit of the output data register is fed back to reduction data generator 42 and is logically ORed with the next output data pattern.

Selector 44 selects four succeeding bits (e.g., 0-3, 1-4, 2-5, or 3-6) among the data stored in output data register 43 and outputs the selected bits. The selection of the 4-bit data is based on the output of zone position generator 45 which generates zone position information (2 bits) representing a zone position (zone 0 of 0-3, zone 1 of 1-4, zone 2 of 2-5, or zone 3 of 3-6) on the basis of the code of the number of carry signals generated by encoding circuit 41.

Figure 3:
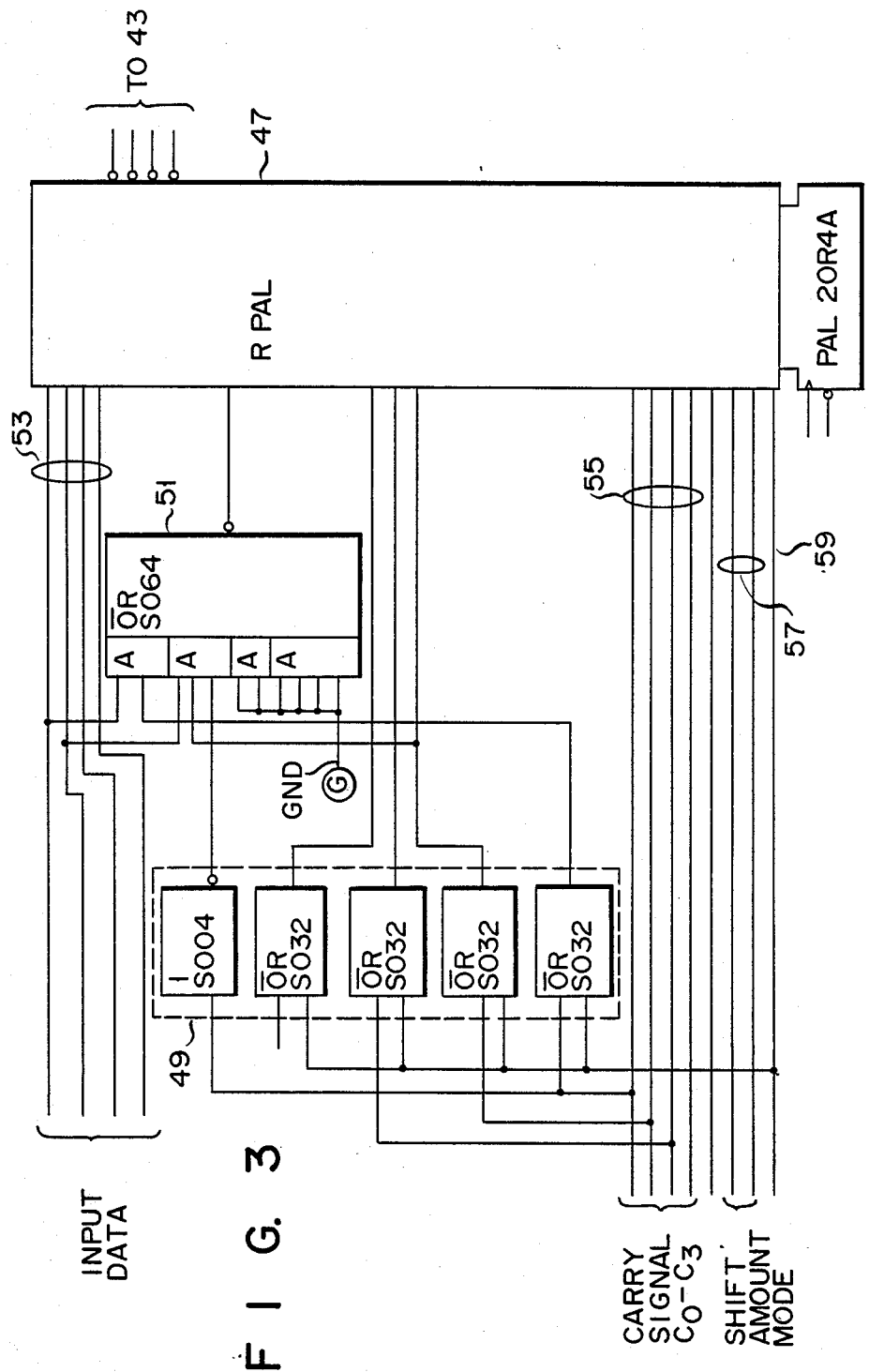
FIG. 3 is a detailed logic diagram of the reduced data generator 42 in FIG. 2.

FIG. 3 is a detailed logic diagram of the reduced data generator 42 shown in FIG. 2. The generator components which are not directly associated with the present invention are partially omitted. Referring to FIG. 3, generator 42 comprises programmable logic array 47, first OR gates 49, and second OR gate 51. Programmable array logic (RPAL) 47 receives input data to be reduced on input line 53. Carry signals C0 through C3 are supplied through input line 55. A shift amount is supplied to RPAL 47 through line 57. A desired mode is set through line 59. There are two ways of mode setting: one is simple extraction (i.e., if the carry signal extracts only the image dot corresponding to logic "1"); and the other is an OR calculation. RPAL 47 is programmed to reduce the input data according to the carry signal. An example of such a program is given later.

First OR gates 49 and second OR gate 51 are additional circuits for modifying the function which is not programmed by RPAL 47.

Feedback from bit 7 of output register 43 to reduced data generator 42 is executed by the program in RPAL 47 in the diagram of FIG. 3.

The-number-of-carries encoding circuit 41 in FIG. 3 can preferably embody a read-only memory. As shown in FIG. 4, encoding circuit 41 receives a 4-bit carry signal add has a conversion table for generating a code representing the number of carry signals of logic "1".

Figure 5:
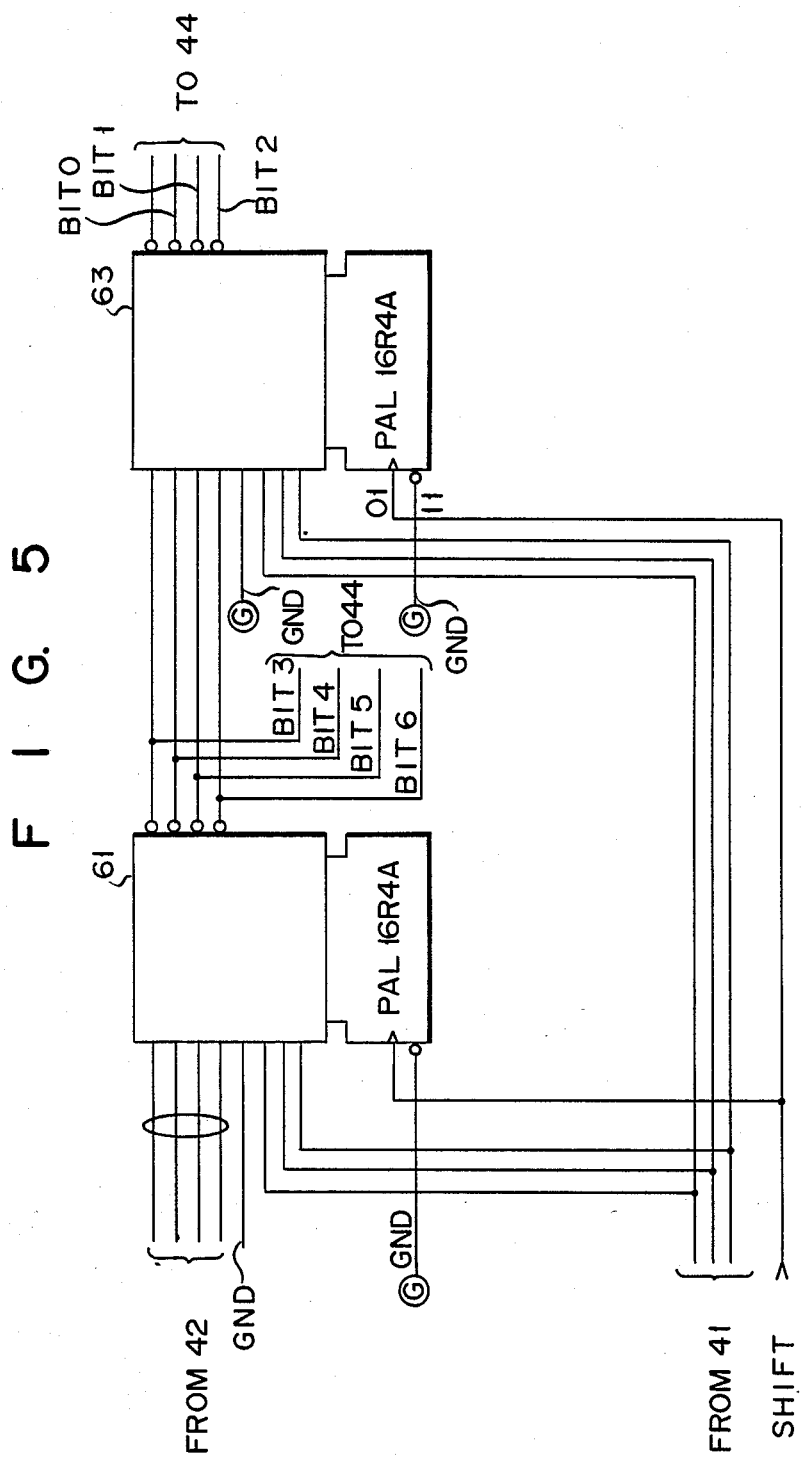
FIG. 5 is a logic diagram showing the detailed arrangement of output data register 43 in FIG. 2.

Output data register 43 in FIG. 2 comprises two programmable array logics (PALs) 61 and 63, as shown in FIG. 5. PALs 61 and 63 are programmed to shift the contents thereof by a designated shift amount, and its program is shown below.

| PAL20R4A | PAL DESIGN SPECIFICATION |
| DC0497P003A | 1985 NOV. 29 Y. HAMADA |
| REDUCE PAL | |
| TOSHIBA JAPAN | |

S10MHZ SRDD3 SRDD2 SRDD1 SRDD0 ORCA3 ORCA2 ORCA1 /ORD3
RDCA0 RDCA1 GND /OE RDCA2 /HLDCXE RDCA1D /REDD0 /REDD1
/REDD2 /REDD3 SFT1 SFT0 CORMX VCC

```
REDD3 :   = ORD3                                      */HLDCXE
          + SRDD1 * /RDCA0 * /RDCA1           ORCA2*/HLDCXE
          + SRDD0 * /RDCA0 * /RDCA1 * /RDCA2 * ORCA3*/HLDCXE
          + RDCA1D * /SFT1 * /SFT0 * REDD3 * CORMX */HLDCXE
          + RDCA1D * /SFT1 * SFT0 * REDD2 * CORMX */HLDCXE
          + RDCA1D * SFT1 * /SFT0 * REDD1 * CORMX */HLDCXE
          + RDCA1D * SFT1 * SFT0 * REDD0 * CORMX */HLDCXE
          + HLDCXE * REDD3
REDD2 :   = SRDD2 * RDCA0 *                     ORCA1*/HLDCXE
          + SRDD1 * /RDCA0 * RDCA1 *            ORCA2*/HLDCXE
          + SRDD1 * RDCA0 * /RDCA1 *            ORCA2*/HLDCXE
          + SRDD0 * /RDCA0 * /RDCA1 * RDCA2 * ORCA3*/HLDCXE
          + SRDD0 * /RDCA0 * RDCA1 * /RDCA2 * ORCA3*/HLDCXE
          + SRDD0 * RDCA0 * /RDCA1 * /RDCA2 * ORCA3*/HLDCXE
          + HLDCXE * REDD2
REDD1 :   = SRDD1* RDCA0 * RDCA1                ORCA2*/HLDCXE
          + SRDD0 * /RDCA0 * RDCA1 * RDCA2 * ORCA3*/HLDCXE
          + SRDD0 * RDCA0 * /RDCA1 * RDCA2 * ORCA3*/HLDCXE
          + SRDD0 * RDCA0 * RDCA1 * /RDCA2 * ORCA3*/HLDCXE
          + HLDCXE * REDD1
REDD0 :   = SRDD0 * RDCA0 * RDCA1 * RDCA2 * ORCA3*/HLDCXE
          + HLDCXE * RED00
```

Each output from PAL 61 corresponds to bit 3 through bit 6 of output register 43 in FIG. 2. Each output from PAL 63 corresponds to bit 0 through bit 2 of output register 43 in FIG. 2.

Figure 6:
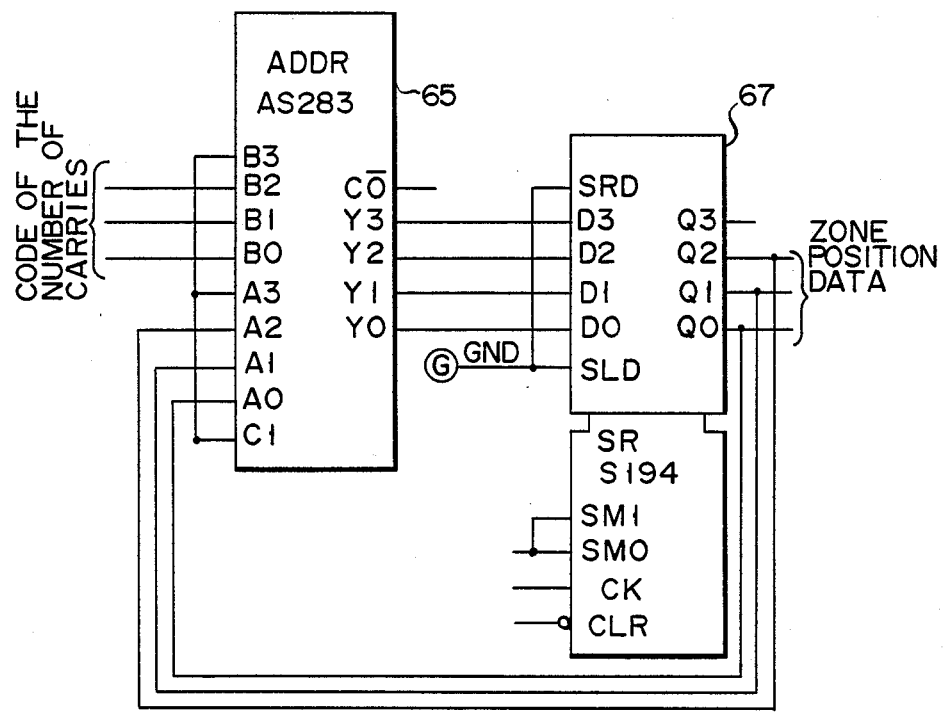
FIG. 6 is a logic diagram showinq the detailed arrangement of the zone position generator 45 in FIG. 2.

The logic diagram of the zone position generator 45 is shown in FIG. 6. Zone position generator 45 comprises adder 65 for adding the codes each representing the number of carry signals input and shift register 67 for holding an accumulated value of outputs from adder 65.

Figure 7:
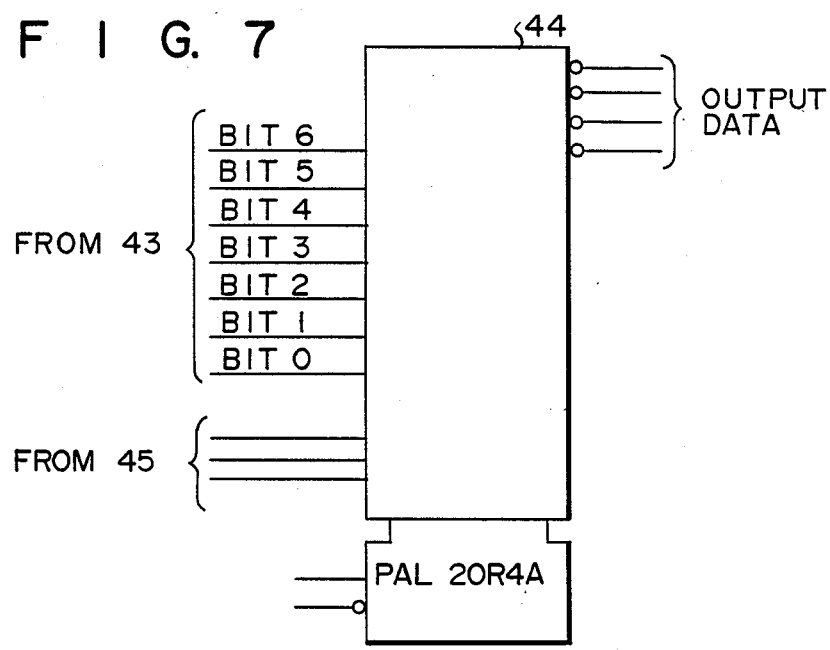
FIG. 7 is a logic diagram of the selector 44 in FIG. 2.

Selector 44 in FIG. 2 comprises a programmable array logic shown in FIG. 7. The programmable array logic is programmed to select four succeeding bits of the six bits output from output register 43 on the basis of zone position information supplied from zone position generator 45. The program is shown below:

| PAL16R4 | PAL DESIGN SPECIFICATION |
| DC0476P005A | 1985 NOV. 29 Y. HAMADA |
| 4 BIT SHIFT PAL | |
| TOSHIBA JAPAN | |

S10MHZ /REDD3 /REDD2 /REDD1 /REDD0 NC SFT2 SFT1, SFT0
GND /OE /Y0 /Y1 /XRD3 /XRD2 /XRD1 /XRD0 Y2 /63 VCC

```
XRD3 :    = REDD3 * SFT2 * /SFT1 * /SFT0
          + XRD3 * /SFT2 * /SFT1 * /SFT0
          + XRD2 * /SFT2 * /SFT1 * SFT0
          + XRD1 * /SFT2 * /SFT1 * /SFT0
          + XRD0 * /SFT2 * SFT1 * SFT0
XRD2 :    = REDD2 * SFT2 * /SFT1 * /SFT0
          + REDD3 * /SFT2 * SFT1 * SFT0
          + XRD2 * /SFT2 * /SFT1 * /SFT0
          + XRD1 * /SFT2 * /SFT1 * SFT0
          + XRD0 * /SFT2 * SFT1 * /SFT0
XRD1 :    = REDD1 * SFT2 * /SFT1 * /SFT0
          + REDD3 * /SFT2 * SFT1 * /SFT0
          + REDD2 * /SFT2 * SFT1 * SFT0
          + XRD1 * /SFT2 * /SFT1 * /SFT0
          + XRD0 * /SFT2 * /SFT1 * SFT0
XRD0 :    = REDD0 * SFT2 * /SFT1 * /SFT0
          + REDD3 * /SFT2 * /SFT1 * SFT0
          + REDD2 * /SFT2 * SFT1 * /SFT0
```

-continued

| PAL16R4 | PAL DESIGN SPECIFICATION |
| DC0476P005A | 1985 NOV. 29 Y. HAMADA |
| 4 BIT SHIFT PAL | |
| TOSHIBA JAPAN | |

+ REDD1 * /SFT2 * SFT1 * SFT0
+ XRD0 * /SFT2 * /SFT1 * /SFT0

Figure 8A:
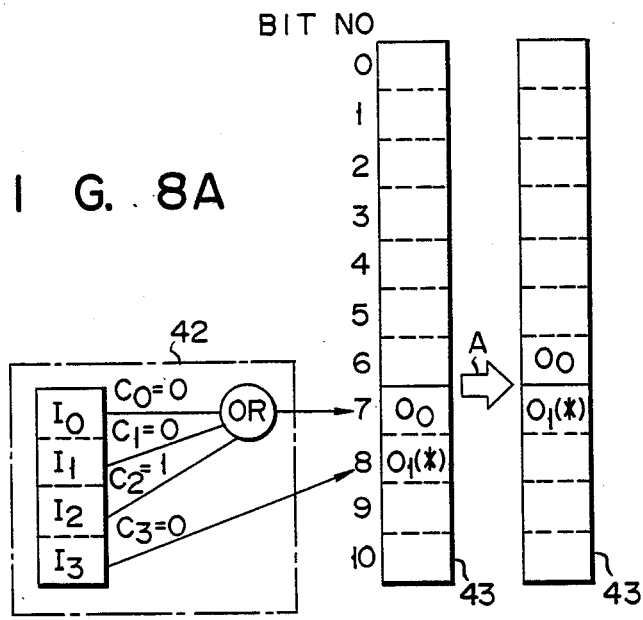
FIGS. 8A through 8C are diagrams for explaining the operation of the image size reduction circuit in FIG. 2.

The operation of the invention in accordance with the embodiment in FIG. 1 will be described with reference to FIG. and FIGS. 8A through 8C when a reduction ratio of ⅓ is used. In the circuit of FIG. 2, tree steps are repeated for ⅓ reduction processing.

Step 1

In step 1 adder 21 adds the contents of scale register 31 and of accumulator 25 which are in the initial state ⅓ and 0 respectively. Adder 22 adds the output from 2 Δ value generator and the contents of accumulator 25 which are in the initial state ⅔ and 0 respectively. Adder 23 adds the output from 3Δ value generator 33 and the contents of accumulator 25 which are 1 and 0 respectively. Adder 24 adds the output from 4Δ value generator 34 and the contents of accumulator 25. In the initial state the respective values are 4/3 and 0. In step 1, since X=0 in accumulator 25, the sums of adders 21, 22, 23 and 24 are ⅓, ⅔, 1, and 4/3, respectively. The decimal part of the sum from adder 24 is ⅓. The decimal part from adder 24 is held by accumulator 25 in response to the clock signal. As a result, the contents of accumulator 25 are updated from "0" to "⅓".

Exclusive OR gate 35 detects a coincidence or noncoincidence between 1-bit portions of the integer parts of the sums from adders 21 and 22. If a coincidence is detected, exclusive OR gate 35 generates carry signal C1 of logic "0". Otherwise, exclusive OR gate 35 generates signal C1 of logic "1". Similarly, exclusive OR gate 36 detects a coincidence or noncoincidence between one-bit portions of the integer parts of the sums from adders 22 and 23. If a coincidence is detected, exclusive OR gate 36 generates carry signal C2 of logic "0". Otherwise exclusive OR gate 36 generates signal C1 of logic "1". Exclusive OR gate 37 detects a coincidence or noncoincidence between one-bit portions of the sums from adders 23 and 24. If a coincidence is detected, exclusive OR gate 37 generates carry signal C3 of logic "0". Otherwise, exclusive OR gate 37 generates signal C3 of logic "1".

The exclusive OR products of the sums from adders 21 through 24 are calculated for the following reason.

If the reduction ratio is ⅓, the pattern of the carry signals as image size conversion control signals is a pattern in which logic "1" appears for every two bits, i.e., a pattern of "0", "0", "1", "0", "0", "1", ... However, the carry signals from adders 21 through 24 do not always coincide with the above bit pattern. For example, if the contents X of accumulator 25 is "0" and content of scale register 31 is "⅓", the sums from adders 21 through 24 are sequentially "⅓", "⅔", "3/3", and "4/3", and the logic levels of the corresponding carry signals are "0", "0", "1", and "1". The pattern of the carry signals does not coincide with the desired bit pattern. In order to prevent this, when a carry signal of logic "0" appears, the logic level of the immediately preceding carry signal is referenced. If the immediately preceding carry signal is set at logic "1", the subsequent carry signal is set at logic "0". For example, if the carry signal from adder 22 is set at logic "1" and the carry signal from adder 21 is also set at logic "1", the exclusive OR product of outputs from adders 21 and 22 is calculated to set the carry signal from OR gate 35 to be logic "0". The output of logic "0" is thus output as carry signal C1. Similarly, if the carry signals from adders 22 and 23 are set at logic "1", the carry signal from adder 23 is set at logic "0" and is output as carry signal C2. If the carry signals from adders 23 and 24 are set at logic "1", an exclusive OR product is calculated such that the carry signal from adder 24 is set at logic "0" and is output as carry signal C3.

Figure 1:
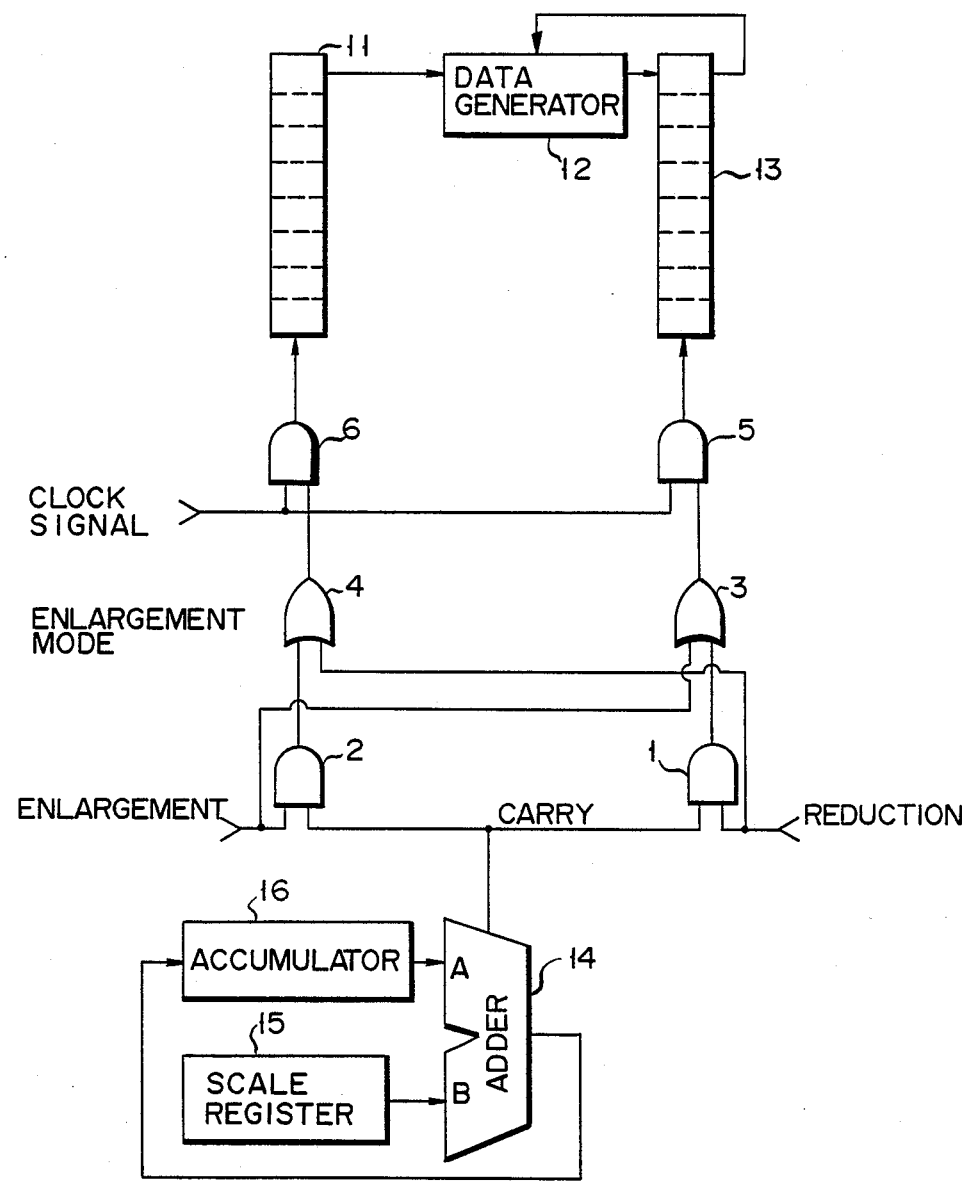
FIG. 1 is a block diagram of a conventional image size converter.

As is apparent from the above description, carry signal C0 as one bit of the integer part from adder 21 and carry signals C1, C2, and C3 as outputs from exclusive OR gates 35 through 37 correspond to carry signals in the 4kth (where k=0, 1, 2, ...), (4k+1)th, (4k+2)th, and (4k+3)th additions in adder 14 of the conventional circuit of FIG. 1. According to this embodiment, the carry signals required for image size reduction can be generated at a rate four times that of the conventional circuit in FIG. 1.

In step 1, one-bit portions of the integer parts of the sums from adders 21 through 24 are respectively "0", "0", "1", and "1". The logic levels of carry signals C0 through C3 are "0", "0", "1", and "0", as shown in the operation diagram of FIG. 8A. Signals C0 through C3 are supplied to reduced data generator 42. Generator 42 also receives 4-bit input data (a reduction object input dot pattern) in response to a clock signal (not shown). Assume that four bits of input data from the MSB in step 1 are defined as I0, I1, I2, and I3. In this case, since logic levels of signals C0, C1, C2 and C3 are "0", "0", "1", and "0", generator 42 continuously reduces the image size of the dot pattern until the carry signal of logic "1" appears, i.e., up to the position of input bit I2. In accordance with this invention, two types of techniques are available to reduce the image size. One is a technique for validating only the dot corresponding to the carry signal of logic "1" and invalidating dots corresponding to carry signals of logic "0". The other is a technique for calculating an OR product of dot patterns until the carry signal of logic "1" appears and employing the OR output as a dot pattern for each image size reduction cycle. However, in this embodiment, for the sake of simplicity, the technique for calculating the OR product will be described. Reduced data generator 42 calculates an OR product of bits I0 through I2. The OR product is stored at the 7th bit position of output data register 43, as shown in FIG. 8A, provided that the start output bit is given as 00. Bit I3 is stored at the 8th bit position of register 43, as shown in FIG. 8A, and serves as output bit 01(*) to be reduced next.

Carry signals C0 through C3 are supplied to the-number-of-carries encoding circuit 41. Encoding circuit 41 encodes signals C0 through C3 and generates a 3-bit code representing the number of significant carry signals as shown in FIG. 4 (i.e., the number of carry signals of logic "1"). In step 1 wherein signals C0, C1, C2, and C3 are respectively "0", "0", "1", and "0", the code of the number of carry signals is given as "001". This code is supplied to output data register 43. Register 43 performs barrel shifting by a value represented by the code from encoding circuit 41. As a result, 00 and 01(*) at the 7th and 8th bit positions of register 43 are shifted to the 6th and 7th bit positions, as indicated by arrow A in FIG. 8A.

The code from the-number-of-carries encoding circuit 41 is also supplied to zone position generator 45. Generator 45 accumulates the codes. An accumulated result is used to count the number of cycles for outputting signals from reduced data generator 42 to output data register 43. When the accumulated result represents 4 times or cycles, i.e., the output is sent from generator 42 to register 43 four times, the MSB of the 3-bit sum is set at logic "1" (however, the MSB is not set at logic "1" in step 1). When the MSB of the 3-bit sum is set at logic "1", it indicates that an output dot pattern of 4 or more bits is present in output register 43. Zone position generator 45 supplies the lower 2 bits of the accumulated value as zone position information to selector 44. If zone position information is "00", it indicates a zone of the 3rd through 6th bits of output data register 43. If information is "01", it indicates a zone of the 2nd and if "11", a zone of the 0th through 3rd bits.

Step 2

In step 2, since the content X of accumulator 25 is ⅓, the sums from adders 21 through 24 are respectively "⅔", "3/3", "4/3", and "5/3". The logic levels of one-bit portions of the integer parts of the sums are respectively "0", "1", "1", and "1". The logic levels of carry signals C0, C1, C2, and C3 are "0", "1", "0", and "0". In this case, the decimal part of the sum from adder 24 is "⅔". Therefore, content X of accumulator 25 is updated from "⅓" to "⅔".

Figure 8B:
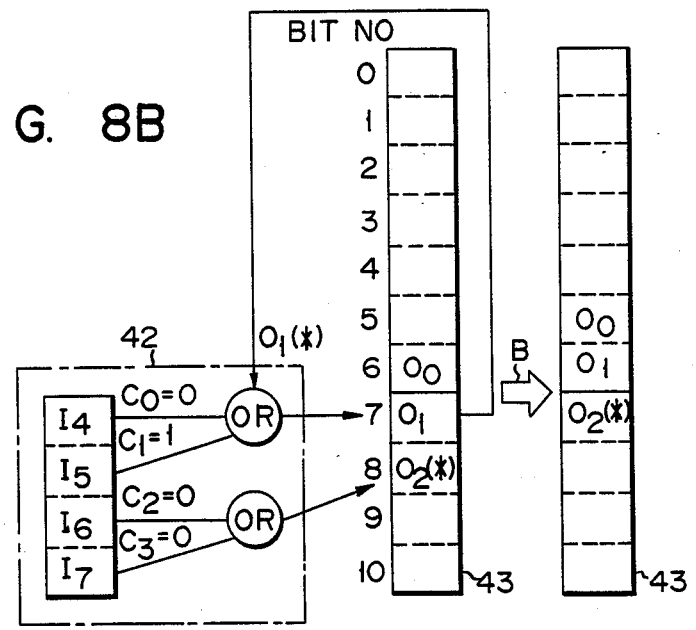

Referring to FIG. 8B, if the bits from the start bit of input data (4 bits) in step 2 are defined as I4, I5, I6, and I7, reduced data generator 42 calculates an OR product of a nonreduced "01(*)" held at the 7th bit position of register 43, I4, and I5 since the logic levels of carry signals C0, C1, C2, and C3 are respectively "0", "1", "0", and "0". The OR product is stored as nonreduced output bit "01" at the 7th bit position of output data register 43, as shown in FIG. 8B. Reduced data generator 42 calculates an OR product of I6 and I7. The OR result is stored as nonreduced output bit 02(*) at the 8th bit position of output data register 43, as shown in FIG. 8B.

Register 43 performs parallel shifting by the number of carry signals of logic "1" represented by the code in the same manner as in step 1. In step 2 where logic levels of carry signals C0, C1, C2, and C3 are respectively "0", "1", "0", and "0", the code is "001". Barrel shifting is performed in step 2. Bits 00, 01 and 02(*) at the 6th, 7th, and 8th bit positions of register 43 are shifted to the 5th, 6th, and 7th positions, as indicated by arrow B in FIG. 8B, respectively. An accumulated value (3 bits) of codes representing the numbers of 2-bit carry signals in zone position generator 45 is given as "010".

Step 3

In step 3, since the contents X of accumulator 25 is ⅔, the sums of adders 21, 22, 23 and 24 are "3/3", "4/3", "5/3", and "6/3", respectively. The logic levels of one-bit portions of the sums are "1", "1", "0", and "0", and the logic levels of carry signals C0, C1, C2, and C3 are "1", "0", "0", and "1", respectively. The decimal part of the sum from adder 24 is "0". Therefore, contents X of accumulator 25 is updated from "⅔" to "0".

Figure 8C:
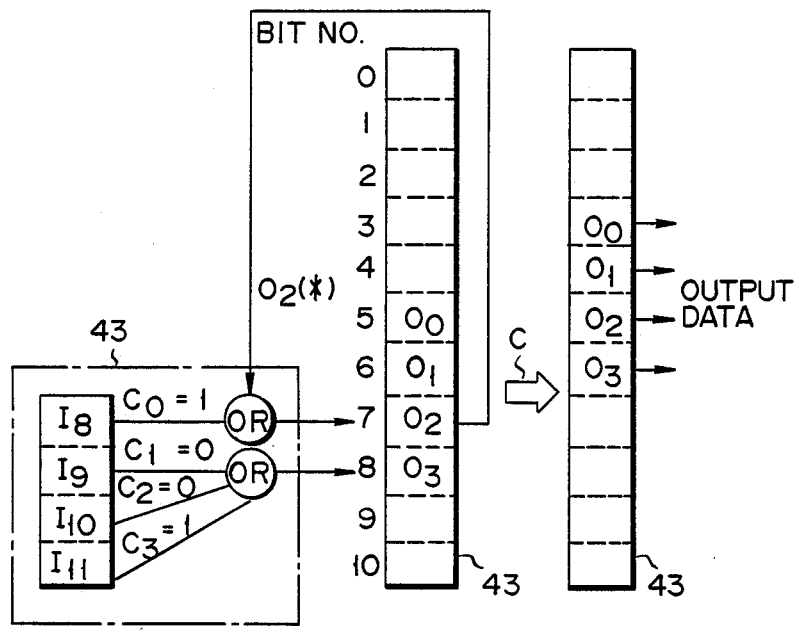

Assume bits from the start bit of input data (4 bits) in step 3 are given as I8, I9, I10, and I11, respectively, as shown in FIG. 8C. Since logic levels of carry signals C0 through C3 are respectively "1", "0", "0", and "1" in this case, reduced data generator 42 calculates an OR product of nonreduced bit 02(*) held at the 7th bit position of output data register 43 and input bit I8. This OR product is stored as nonreduced output bit O2 at the 7th bit position of register 43, as shown in FIG. 8C. Generator 42 calculates an OR product of I9 through I11. This OR product is stored as nonreduced output bit 03 at the 8th bit position of register 43, as shown in FIG. 8C.

In output data register 43, barrel shifting is performed on the basis of the number represented by the code in the same manner as in step 1. In step 3 the logic levels of carry signals C0 through C3 are respectively "1", "0", "0", and "1", the code of the number of carry signals of logic "1" is "010" (FIG. 4). Therefore, 2-bit barrel shifting is performed in step 3. Bits 00, 01, 02, and 03 at the 5th, 6th, 7th, and 8th bit positions of output data register 43 are shifted to the 3rd, 4th, 5th, and 6th bit positions, as indicated by arrow C in FIG. 8C.

In step 3, zone position generator 45 adds code "010" to the accumulated code value "010" representing the number of 2-bit carry signals obtained up to step 2. The 3-bit sum calculated by generator 45 is "100". When the MSB of the 3-bit sum in step 3 is "1", generator 45 supplies the lower two bits of the sum as zone position information to selector 44. Selector 44 selects four output bits from the zone position of data register 43 on the basis of the zone position information. The selected bits constitute output data. Since the zone position information is "00" in this case, the contents of the 3rd through 6th bits of output data register 43, i.e., 00 through 03, are selected.

In step 3, the contents X of accumulator 25 is updated from "⅔" to "0" (i.e., the initial value). Therefore, in ⅓ reduction processing by the circuit in FIG. 2, the operations in steps 1 through 3 are repeatedly performed for 4-bit input data.

In the above embodiment, since 2-bit reduced data is supplied from reduced data generator 42 to output register 43, the pieces of reduced data are packed in units of four bits, and 4-bit reduced data is output from selector 44. For this purpose, the circuit includes the-number-of-carries encoding circuit 41, output register 43, zone position generator 45, and selector 44. However, the present invention can be realized without using these components.

For the sake of simplicity, in the above embodiment, reduced data generator 42, output data register 43, and selector 44 are operated in the same step on the basis of the same carry signals C0 through C3. However, as is apparent from the circuit in FIG. 1, pipeline processing can also be performed.

Figure 9:
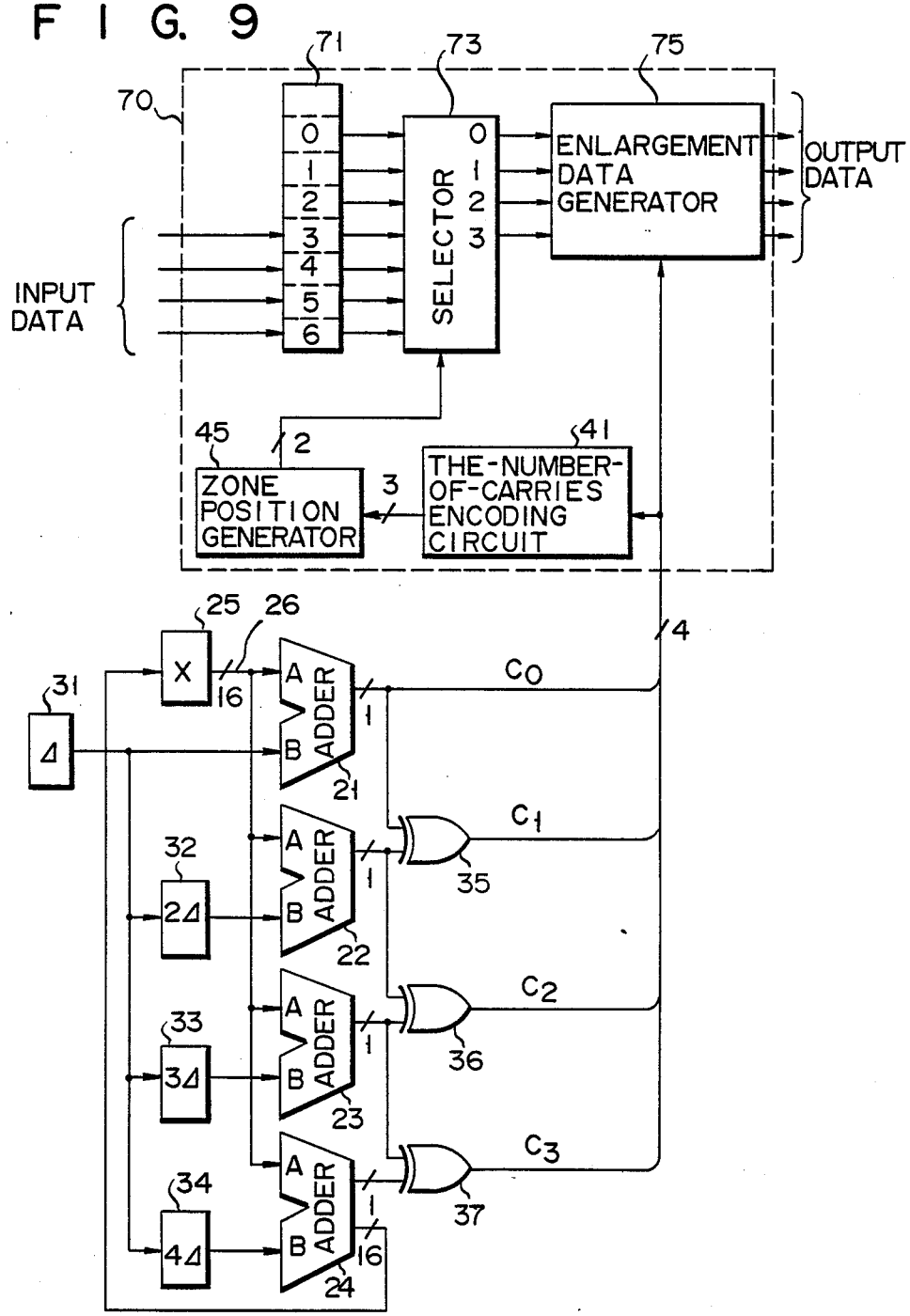
FIG. 9 is a block diagram of an image size enlargement circuit as the image size converter according to another preferred embodiment of the present invention.

FIG. 9 is a block diagram showing a second preferred embodiment of the present invention. The same reference numerals as in FIG. 2 denote the same parts of the image size converter of FIG. 9. The circuit in FIG. 9 is an image size enlargement circuit. Scale register 31 stores scale values as inverse numbers of enlargement ratios in place of reduction ratios.

Enlargement data generator 70 receives 4-bit input data and determines the correspondence between bit 1 through 4 of the 4-bit input data and 4-bit output data on the basis of carry signals C0 through C3. Input data register 71 stores 4-bit input data in response to a clock signal. Register 71 comprises two 4-bit registers and has a function of 4-bit shifting. If seven bits from the upper bits, excluding the MSB of input data register 71, are given as 0th, 1st, . . . 6th bits, the 0th through 2nd bits are used only for outputs to the next stage, and the 3rd through 6th bits are used for an input zone of the 4-bit input data and an output zone for the next stage. Selector 73 selects four succeeding bits of the data (i.e., the 0th through 6th bits) from input data register 71.

The-number-of-carries encoding circuit 41 has the same arrangement as that in FIG. 2. Encoding circuit 41 in FIG. 9 encodes carry signals C0 through C3 and generates a 3-bit code representing the number of carry signals of logic "1".

Zone position generator 45 has the same arrangement as that in FIG. 2. Generator 45 in FIG. 9 generates zone position information (2 bits) representing a zone position of register 71 which includes 4-bit data to be selected by selector 73. The zone position information is generated on the basis of the code generated by encoding circuit 41. If the zone position information is "01", then it represents a zone of the 0th through 3rd bits of input data register 71; if "10", then a zone of the 1st through 4th bits; if "11", then a zone of the 2nd through 5th bits; and if "00", a zone of 3rd through 6th bits. Enlargement data generator 75 uses 4-bit data selected by selector 73 and generates 4-bit output data enlarged on the basis of the carry signals.

Figure 10:
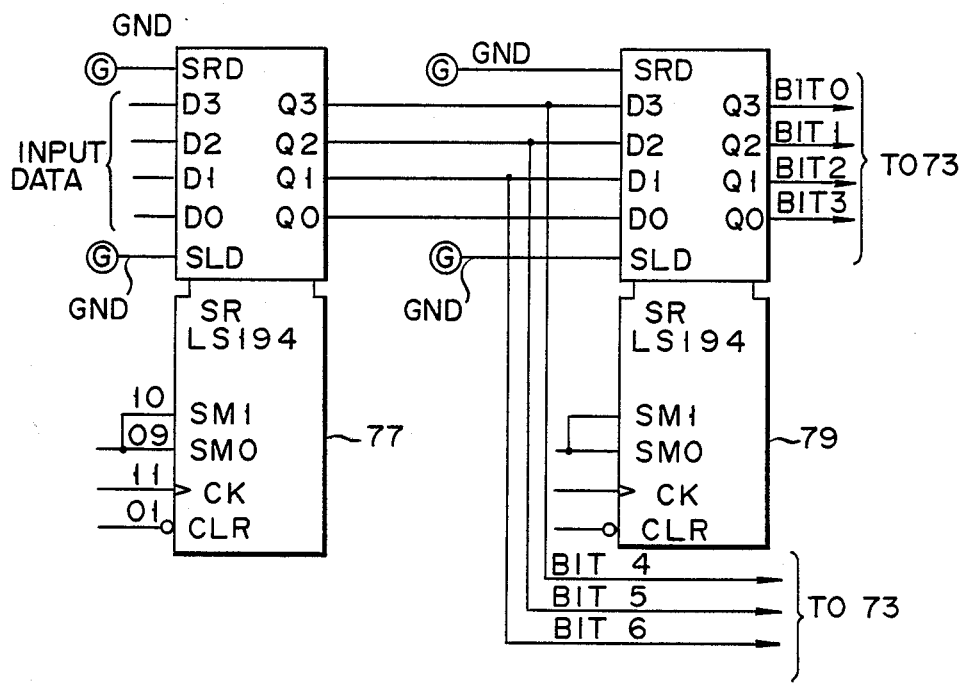
FIG. 10 is a logic diagram showing the detailed arrangement of input data register 71 in FIG. 9.
Figure 11:
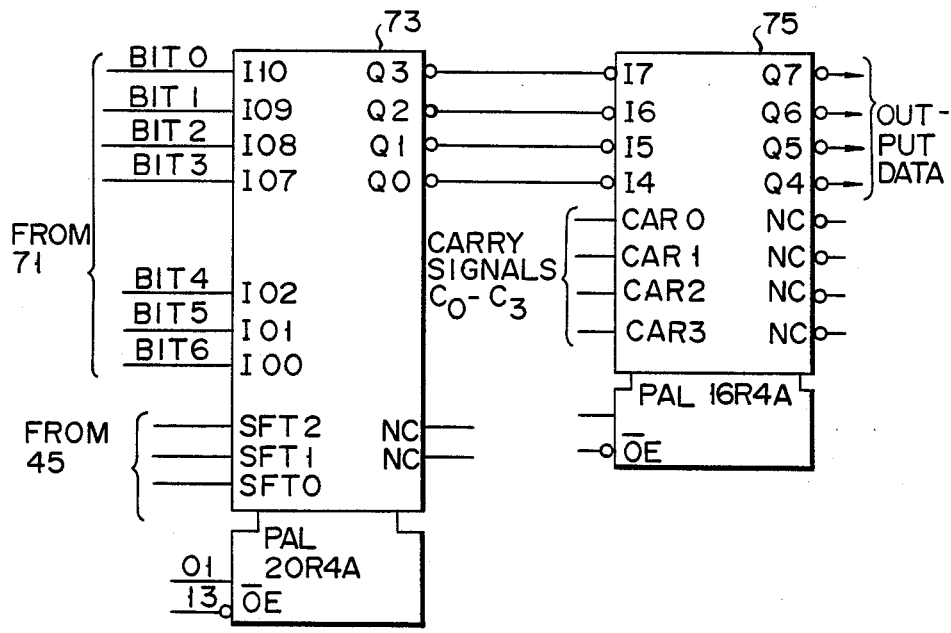
FIG. 11 is a detailed logic diagram of the selector 73 in FIG. 9.

Input data register 71, in FIG. 9 comprises first and second shift registers 77 and 79, as shown in FIG. 10. Selector 73 and enlargement data generator 75 in FIG. 9 comprise programmable array logics (PALs), respectively, as shown in FIG. 11. PAL 73 is programmed to receive 6-bit information from input register 71 and output 4-bit information of a designated zone to generator 75 on the basis of zone position information supplied from zone position generator 45. Enlargement data generator 75 is programmed to enlarge 4-bit dot pattern data from selector 73 on the basis of carry signals C0 through C3.

The operation of the circuit in FIG. 9 will be described with reference to FIGS. 12A through 12D when the enlargement ratio is 3/1.

The scale value used is an inverse number of the enlargement ratio; thus ⅓ is the scale value which is the same as in the first embodiment. Carry signals C0 through C3 recur in an order of "0", "0", "1", "0"; "0", "1", "0", "0"; and "1", "0", "0", "1". Therefore, 3×enlargement processing can be achieved by repeating the three steps described below.

Step 1

Figure 12A:
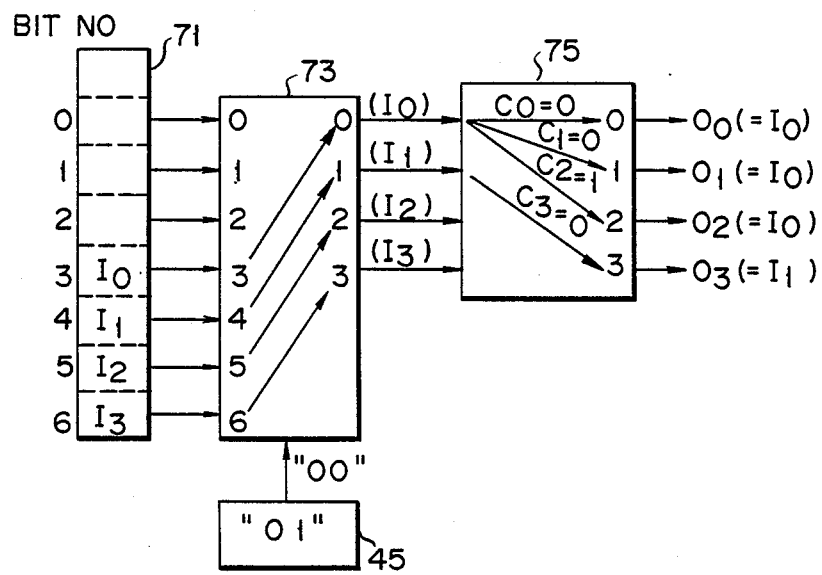
FIGS. 12A through 12D are diagrams for explaining the operation of the image size enlargement circuit in FIG. 9.

Assume that 4-bit input data is input to input data register 71 in step 1. The bits from the start bit of this input data are respectively defined as I0, I1, I2, and I3. Bits I0 through I3 are respectively stored at the 3rd through 6th bit positions of register 71, as shown in FIG. 12A.

In step 1, the logic levels of carry signals C0, C1, C2, and C3 are respectively "0", "0", "1", and "0" in the same manner as in the first embodiment. Signals C0 through C3 are supplied to the-number-of-carries encoding circuit 41. Encoding circuit 41 encodes the carry signals and generates a 3-bit code representing the number of carry signals of logic "1" in the same manner as in encoding circuit 41 of FIG. 2. In step 1 wherein the logic levels of carry signals C0, C1, C2, and C3 are respectively "0", "0", "1", and "0", the code is "001" (FIG. 4). The code is also supplied to zone position generator 45. Generator 45 adds the code to an accumulated value ("000" in this case) of codes. The lower two bits of the 3-bit sum from generator 45 are used as zone position information. Therefore, in step 1, accumulated value "00" is supplied as zone position information to selector 73.

If the zone position information from zone position generator 45 is "00", selector 73 selects the contents of the 3rd through 6th bits of input data register 71, i.e., input bits I0 through I3 from the 0th through 3rd bits of selector 73. The selected bits are sent to enlargement data generator 75, as shown in FIG. 12A. Carry signals C0 through C3 are supplied to generator 75. Dots of input data are copied by generator 75 until a carry signal of logic "1" appears. More specifically, since the logic levels of carry signals C0 through C3 are respectively "0", "0", "1", and "0", each dot of the input data is copied three times. In this case, start input bit I0 is output as output bits O0 through O2 from the 0th through 2nd bits of generator 75. The next input bit I1 is output as output bit O3 from the 3rd bit position of generator 75.

Step 2

When enlargement processing of start bit I0 of 4-bit data in step 1 is completed, remaining bits I1 through I3 are shifted by 4 bits to the 0th through 2nd bits of input data register 71. Therefore, subsequent 4-bit input data is stored at the 3rd through 6th bit positions. In this case, this input data consists of I4 through I7.

In step 2, the logic levels of carry signals C0, C1, C2, and C3 are respectively "0", "1", "0", and "0" in the same manner as in step 2 of the first embodiment. In this case, the code generated by encoding circuit 41 is "001" (FIG. 4). Zone position generator 45 adds code "001" to the accumulated value "01" of codes representing the numbers of carry signals of logic "1" calculated up to step 1. The accumulated value "10" as the lower two bits of the 3-bit sum is used as zone position information in the next step, i.e., step 3. In step 2, accumulated value "01" up to step 1 is supplied as zone position information to selector 73.

Figure 12B:
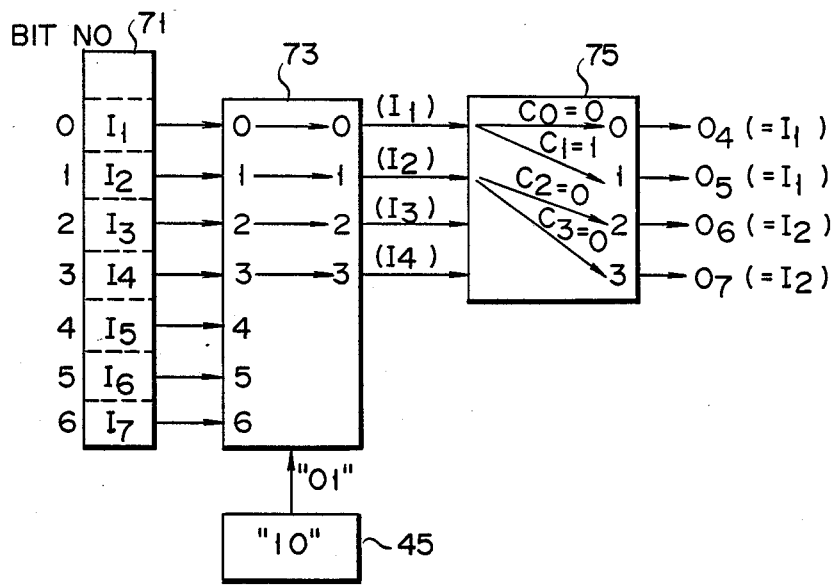

If zone position information from zone position generator 45 is "01", the contents, i.e., input bits I1 through I4 are output from the 0th through 3rd bits of selector 73. Input bits I1 through I4 are input to enlargement data generator 75, as shown in FIG. 12B. Since the logic levels of carry signals C0 through C3 are respectively "0", "1", "0", and "0", generator 75 copies input dot I1 up to the 1st bit (the output bit O5 position in this case) of 4-bit output data. Generator 75 generates start input bit I1 as output bits O4 and O5 from the 0th and 1st bit positions thereof and the next input bit I2 as output bits O6 and O7 from the 2nd and 3rd bit positions.

Step 3

In step 3, the logic levels of carry signals C0, C1, C2 and C3 are respectively "1", "0", "0", and "1". In this case, a code generated by the-number-of-carries encoding circuit 41 is "010". Zone position generator 45 adds code "010" to accumulated value "010" counted up to step 2. The lower two bits "00" of the resultant sum "100" are used as zone position information in step 4. In step 3, value "10" accumulated up to step 2 is supplied as zone position information to selector 73.

Figure 12C:
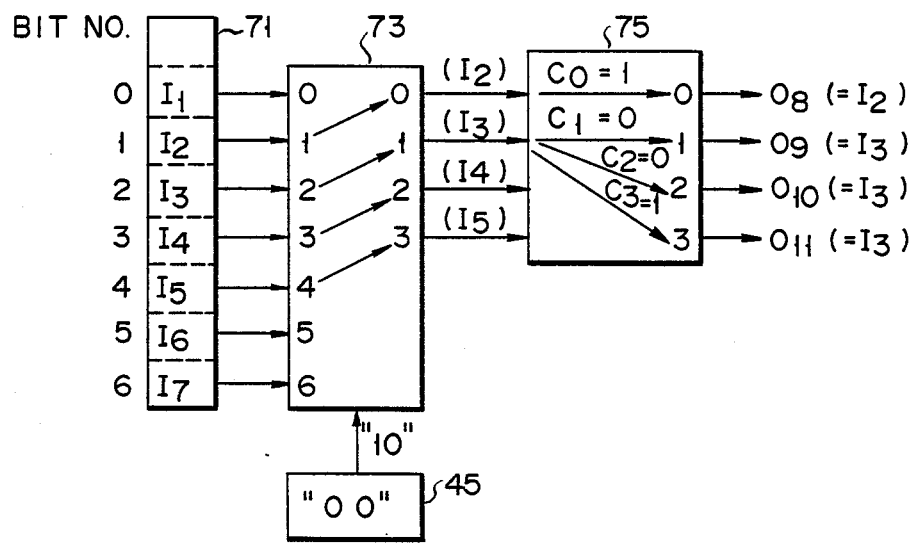

If zone position information from zone position generator 45 is "10", selector 73 selects the contents of the 1st through 4th bits of input data register 71, i.e., input bits I2 through I5 from the 0th through 3rd bit positions and outputs the selected bits to enlargement data generator 75, as shown in FIG. 12C. If the logic levels of carry signals C0 through C3 are respectively "1", "0", "0", and "1", generator 75 copies input dot I2 up to the 0th position (the position of output bit 08 in this case) of 4-bit output data. Generator 75 then copies input data I3 up to the 3rd bit position (position of output bit 08 in this case). In this case, generator 75 outputs start input bit I2 as output bit 08 from its 0th bit position, and the next input bit I3 as output bits 09 through 011 from its 1st through 3rd bit positions.

Step 4

Since the logic levels of the carry signals C0 through C3 are respectively "0", "0", "1", and "0" in the same manner as in step 1 a code representing the number of carry signals of logic "1" is "001". Value "00" of accumulated codes representing the numbers of carry signals of logic "1" is updated to be "001" in zone position generator 45. Updated value "01" is used as zone position information in step 5. In step 4, value "00" as a result of accumulation up to step 3 is supplied as zone position information to selector 73.

Figure 12D:
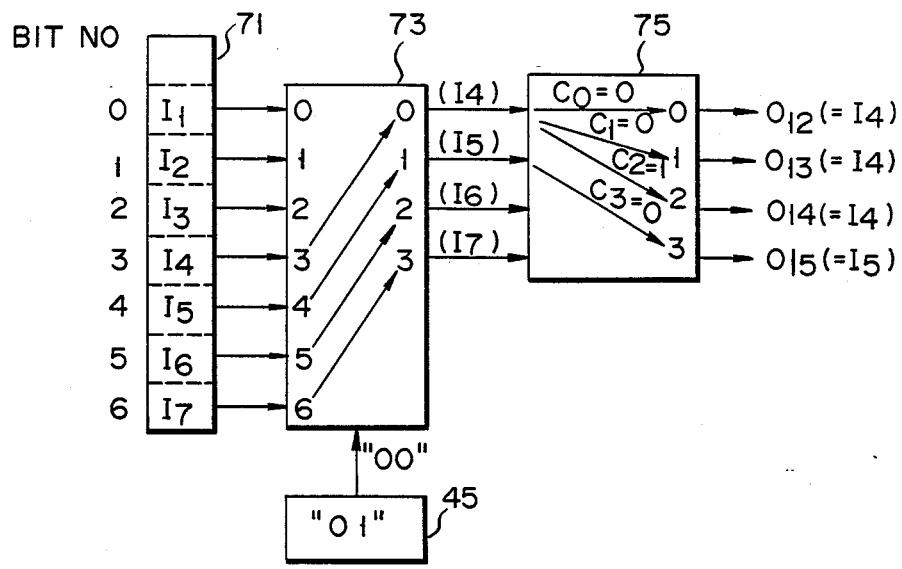

If zone position information from zone position generator 45 is "0", selector 73 selects the contents of the 3rd through 6th bit positions of input data register 71, i.e., input bits I4 through I7 in this case, from the 0th through 3rd bit positions of selector 72. The selected bits are output to enlargement data generator 75, as shown in FIG. 12D. When the logic levels of carry signals C0 through C3 are respectively "0", "0", "1", and "0", generator 75 outputs start input bit I4 as output bits 012 through 014 from the 0th through 2nd bits thereof. The next input bit I5 is set as output bit 015 at the 3rd bit position of generator 75. Enlargement processing in step 4 is the same as that in step 1.

When enlargement processing of start bit I4 of the 4-bit input data is completed, remaining input bits I5 through I7 are shifted by four bits to the 0th through 2nd bit positions of input data register 71. The following 4-bit input data is stored in the 3rd through 6th bit positions, and the same operation as in step 2 is performed. Processing in step 6 and subsequent steps is the same as described above. 3× enlargement is repeated in units of 3 steps.

In the embodiments of FIGS. 2 and 9, the one-bit portion of the integer part of the sum from adder 21 is given as carry signal C0. However, a carry from the decimal part of the sum from adder 21 to the integer part may be used as carry signal C0.

The decimal part of the sum from adder 24 is stored in accumulator 25 in FIG. 2. However, a sum including the integer part may be stored in accumulator 25. In this case, signal lines must be connected such that only the decimal part of the contents of accumulator 25 is supplied to input A of adder 21. All contents, i.e., both the integer and decimal parts of accumulator 25, may be supplied to inputs A of adders 22 through 24.

Furthermore, when the sum, including the integer part from adder 24, is stored in accumulator 25 as shown in FIGS. 2 and 9, the one-bit portion of the integer part (if the integer part consists of a plurality of bits, the one-bit portion is the least significant bit (LSB) among the contents of accumulator 25 and the one-bit portion of the integer part (if the interger part consists of a plurality of bits, the one-bit portion is the LSB) of the sum from adder 21 are calculated by an exclusive OR gate, and an output signal from the gate may be used as carry signal C0. In this case, both the integer and decimal parts as contents of accumulator 25 may be input to input A of adder 21.

In each of the embodiments described above, exclusive OR gate 35 is used to produce, e.g., carry signal C1. However, a comparator may be used in place of the exclusive OR gate. In this case, if the integer part of the sum from adder 22 consists of a plurality of bits, a noncoincidence of the integer part may be detected.

What is claimed is:

1. An image size converter which receives input dot pattern data, for enlarging or reducing the image size of the input dot pattern data corresponding to a scale value, comprising:
   means for inputting the scale value to the image size converter;
   means for receiving the scale value and for generating in parallel a plurality of carry signals corresponding to the input scale value; and
   means for receiving in parallel said plurality of carry signals and the input pattern data and for copying the input dot pattern data in accordance with occurrence of a predetermined carry signal, among said plurality of carry signals, when enlarging the image size of the input dot pattern data, and for performing one of thinning and logical ORing the input dot pattern data in accordance with occurrence of the predetermined carry signal, among said plurality of carry signals, when reducing the image size of the input dot pattern data in response to the scale value.

2. The image size converter according to claim 1, wherein said means for generating a plurality of carry signals comprises:
   means for generating predetermined multiple of the scale value;
   first through nth adders, each of which receives one of said predetermined multiples of the scale value at a first input thereof, n being an integer of 2 or more;
   a register for holding an output sum from said nth adder and for supplying the output to a second input of each of said first through nth adders, a content of said register being updated for each of predetermined sets of input dot pattern data; and
   first through (n−1)th noncoincident detecting means, each connected between an adjacent two adders, for detecting noncoincidence between a least significant bit of each sum from said second through nth adders and of said first through (n−1)th adders, respectively, and for generating said plurality of carry signals, each said detecting means generating one of said plurality of carry signals in response to the sums applied thereto.

3. The image size according to claim 2, wherein said output sum comprises an integer part and a fraction part, and said register holds at least the fraction part of the output of said nth adder and supplies the fraction part to said second input of each of said first through nth adders.

4. The image size converter according to claim 2, wherein said first through (n−1)th noncoincidence detecting means detects noncoincidence between least significant bits of integer parts of the sums from said respective second through nth adders and of said respective first through n−1)th adders.

5. The image size converter according to claim 2, wherein said means for receiving said plurality of carry signals receives as said carry signals a least significant bit of an integer part of the sum of said first adder, and the result of said first through n−1th noncoincidence detecting means.

6. The image size converter according to claim 1, wherein said means for producing an output dot pattern comprises a programmable logic array.

7. An image size converter which receives input dot pattern data for enlarging or reducing an image size in accordance with a scale value to the image size converter;
 means, operatively coupled to said inputting means, for receiving said scale value and for generating in parallel a plurality of carry signals;
 means for receiving and processing the input dot pattern data and for generating output dot pattern data; and
 means, operatively coupled to receive said carry signals, for controlling the processing of the image pattern data in response to parallel input of said carry signals to modify the output dot pattern data in accordance with the scale value.

8. The image size converter according to claim 7, wherein said means for generating a plurality of carry signals comprises:
 means for generating predetermined multiples of the scale value;
 first through nth adders each of which receives one of said predetermined multiples of the scale value at a first input, n being an integer of 2 or more;
 a register for holding an output from said nth adder and for supplying the output to a second input of each of said first through nth adders, a content of said register being updated for each of predetermined sets of input dot pattern data; and
 first through (n−1)th noncoincidence detecting means, each connected between an adjacent two adders, for detecting noncoincidence between a least significant bit of each sum from said second through nth adders and of said first through (n−1)th adders, respectively, and for generating said plurality of carry signals, each said detecting means generating one of said plurality of carry signals in response to the sums applied thereto.

9. The image size converter according to claim 8, wherein said first through (n−1)th noncoincidence detecting means detects noncoincidence between least significant bits of integer parts of the respective sums from said second through nth adders and of said first through (n−1)th adders.

10. The image size converter according to claim 8, wherein said means for generating output dot pattern data receives as said carry signals a least significant bit of an integer part of the sum of said first adder, and the result of said first through (n−1)th noncoincidence detecting means.

11. The image size converter according to claim 7, wherein said means for producing an output dot pattern comprises a programmable logic array.

12. An image size converter for converting the image size in accordance with a scale value comprising:
 first through nth scale generators for generating outputs respectively weighted by factors 1 through n times the scale value, n being an integer of 2 or more;
 first through nth adders, each of which receives a corresponding output from said first through nth scale generators at respective first inputs thereof;
 a register for holding an output sum from said nth adder and for supplying the output to respective second inputs of each of said first through nth adders;
 first through (n−1)th detecting means each connected between an adjacent two adders for detecting noncoincidence between a least significant bit of each sum from respective second through nth adders and of respective first through (n−1)th adders and producing detection results; and
 a size conversion data generator for receiving a dot pattern input in units of n bits and for determining correspondence between the n-bit input dot pattern and a carry signal indicating a carry from a fraction part to an integer part from an addition by said first adder and detection results of said first through (n−1)th detecting means, said size conversion data generator including means for performing a predetermined bit manipulation on the input dot pattern until detecting a predetermined carry signal.

13. The image size converter according to claim 12, wherein said register holds at least a fraction part of said nth adder and supplies the fraction part to said other input of each of said first through nth adders.

14. The image size converter according to claim 13, wherein said first adder outputs a carry signal of logic "1" representing a carry from a fraction part to an integer part during an addition by said first adder, first through (n−1)th noncoincidence detecting means upon detecting noncoincidence outputting a carry signal or logic "1", and said means for performing a predetermined bit manipulation comprising an image size reduction data generator which includes:
 a reduced generator which receives a pattern input of n bits and receives an addition result of said first adder and detection results of said first through (n−1)th noncoincidence detecting means in a one-to-one correspondence manner, and said reduced data generator thinning out the input dot data until detecting the carry signal of logic "1" from said first adder or said first through (n−1)th noncoincidence detecting means;
 number-of-carries encoding circuit for receiving the carry signals and generating a carry code representing the number of carry signals;
 an output data register, connected to said reduced data generator and said number-of-carries encoding circuit, for receiving the output data from said reduced data generator and for shifting the output data from said reduced data generator by the number of carry signals represented by the carry code from said number-of-carries encoding circuit;
 a selector, connected to said output data register, for selecting succeeding n bits; and
 a zone position generator, connected to said number-of-carries encoding circuit, for generating zone position information which represents a zone position of n-bit data in said output data register to be selected by said selector, and which is defined by the code of the number of carry signals generated from said number-of-carries encoding circuit.

15. The image size converter according to claim 14, wherein said reduced data generator sets the nonreduced dot data in said output data register and eliminates the nonreduced dot data and succeeding image size reduction object dot data.

16. The image size converter according to claim 15, further comprising means for feeding back the nonreduced dot data set in said output data register to said reduced data generator.

17. The image size converter according to claim 14, wherein said output register comprises a barrel shifter.

18. The image size converter according to claim 13, wherein said first adder outputs a carry signal of logic "1" representing a carry from a fraction part to an integer part during an addition by said first adder, each of said first through (n−1)th noncoincidence detecting means upon detecting noncoincidence outputting a carry signal of logic "1", and said means for performing a predetermined bit manipulation comprises an image size enlargement data generator which includes:
- an input register for receiving n-bit image enlargement object dot data;
- a selector, connected to said input register, for selecting succeeding n-bit data from said input register;
- a number-of-carries encoding circuit for receiving the carry signals and generating a carry code representing a number of carry signals;
- a zone position generator, connected to said selector, for generating zone position information which represents bit positions of n-bit data held in said input register to be selected by said selector, and which is defined by the code of the number of carry signals generated from said number-of-carries encoding circuit; and
- an enlargement data generator, connected to said selector, said first adder, and said first through (n−1)th noncoincidence detecting means, for copying the respective dots of the data output from said selector until detecting the carry signal of logic "1" from said first adder and said first through (n−1)th noncoincidence detecting means.

19. The image size converter according to claim 18, wherein said input register performs an n-bit shift function upon completion of enlargement processing of n-bit enlargement object dot data by said enlargement data generator.

20. The image size converter according to claim 12, wherein said first through (n−1)th noncoincidence detecting means detects noncoincidence between least significant bits of integer parts of the respective sums from said second through nth adders and of said first through (n−1)th adders.

21. The image size converter according to claim 20, further comprising an additional noncoincidence detecting means for detecting noncoincidence between at least the least significant bits of the integer part of the sum from said first adder and the contents of said register, and wherein second through nth noncoincidence detecting means among said first through (n−1)th noncoincidence detecting means detect noncoincidence between at least the least significant bits of the integer parts of the respective sums from said second through nth adders and of said first through (n−1)th adders.

22. The image size converter according to claim 12, wherein said size conversion data generator comprises a programmable logic array.

23. The image size converter according to claim 12, wherein said first adder outputs a carry signal of logic "1" representing a carry from a fraction part to an integer part during an addition by said first adder, said first through (n−1)th noncoincidence detecting means upon detecting noncoincidence outputting a carry signal of logic "1", and said means for performing a predetermined bit manipulation comprises an image size reduction data generator which includes:
- a reduced data generator which receives a pattern input of n bits and receives an addition result of said first adder and detection results of said first through (n−1)th noncoincidence detecting means in a one-to-one correspondence manner, and said reduced data generator including means for ORing the input data dot data in accordance with occurrence of the carry signal of logic "1" from said first adder or said first through (n−1)th noncoincidence detecting means;
- a number-of-carries encoding circuit for receiving the carry signals and generating a carry code representing the number of carry signals;
- an output data register, connected to said reduced data generator and said number-of-carries encoding circuit, for receiving the output data from said reduced data generator and for shifting the output data from said reduced data generator by the number of carry signals represented by the carry code from said number-of-carries encoding circuit;
- a selector, connected to said output data register, for selecting succeeding n bits; and
- a zone position generator, connected to said number-of-carries encoding circuit, for generating zone position information representing a zone position of n-bit data to be selected by said selector, and which is defined by the code of the number of carry signals generated from said number-of-carries encoding circuit.

24. The image size converter according to claim 23, wherein said reduced data generator reduces input dot data of not more than n bits by setting nonreduced dot data in said output data register and by ORing the nonreduced dot data and succeeding image size reduction object dot pattern data.

25. The image size converter according to claim 24, further comprising means for feeding back the nonreduced dot data set in said output data register to said reduced data generator.

26. The image size converter according to claim 23, wherein said output register comprises a barrel shifter.

27. An image size converter which receives input dot pattern data, for enlarging or reducing the image size of the input dot pattern data in accordance with a scale value, comprising:
- means for inputting the scale value to the image size converter;
- means for receiving the scale value input from said inputting means;
- 1X through nX value generators for generating 1X through nX values of the scale value, n being an integer of 2 or more;
- first through nth adding means, each of which receives the 1X through nX values from said 1X through nX value generators at a first input thereof, respectively;
- holding means for holding an output sum from said nth adder and supplying the output to a second input of each of said first through nth adders, a content held by said holding means being updated for each of predetermined sets of input dot pattern data;
- first through (n−1)th noncoincidence detecting means, each connected between an adjacent two adders, for detecting noncoincidence between a least significant bit of each sum from said second through nth adders and of said first through (n−1)th adders, respectively, and for generating detection signals when detecting the noncoincidence, said plurality of detection signals and a signal indicating a carry from a fraction part to an integer part in said first adder being a plurality of carry signals; and means for receiving in parallel said plurality of carry signals and the input dot pattern data and for performing a predetermined bit manipulation on the input dot pattern data in accordance with occurrence of a predetermined carry signal among said plurality of carry signals.

28. An image size converter which receives input dot pattern data, for enlarging or reducing the image size of the input dot pattern data corresponding to a scale value, comprising:

means for inputting the scale value to the image size converter;

means for receiving the scale value input from said inputting means and for generating in parallel a plurality of carry signals corresponding to the input scale value;

means for receiving in parallel said plurality of carry signals and the input dot pattern data and for producing output dot pattern data;

said means for generating a plurality of carry signals including:

means for generating predetermined multiples of the scale value;

first through nth adding means, each of which receives one of said determined multiples of the scale value at a first input thereof, n being an integer of 2 or more;

a register for holding at least a fraction part of the output of said nth adder and supplying the fraction part to a second input of each of said first through nth adders, a connect of said register being updated for each of predetermined sets of input dot pattern data;

first through (n−1)th noncoincidence detecting means, each connected between an adjacent two adders, for detecting noncoincidence between a least significant bit of an integer part of each sum from said respective second through nth adders and of said respective first through (n−1)th adders; and an additional noncoincidence detecting means for detecting noncoincidence between at least the least significant bits of the integer part of the sum from said first adder and the contents of said register, and wherein second through nth noncoincidence detecting means among said first through (n−1)th noncoincidence detecting means detect noncoincidence between at least the least significant bits of the integer parts of the respective sums from said second through nth adders and of said first through (n−1)th adders.

29. An image size converter which receives input dot pattern data, for enlarging or reducing the image size of the input dot pattern data in accordance with a scale value, comprising:

means for inputting the scale value to the image size converter;

means for receiving the scale value from said inputting means and for generating in parallel a plurality of carry signals;

means for receiving in parallel said plurality of carry signals and the input dot pattern data and for producing output dot pattern data;

said means generating a plurality of carry signals including:

means for generating predetermined multiples of the scale value;

first through nth adding means each of which receives one of said determined multiples of the scale value at a first input thereof, n being an integer of 2 or more;

holding means for holding an output sum from said nth adder and supplying the output sum to a second input of each of said first through nth adders, a content held by said holding means being updated for each of predetermined sets of input dot pattern data;

first through (n−1)th noncoincidence detecting means, each connected between an adjacent two adders, for detecting noncoincidence between a least significant bit of each sum from said second through nth adders and of said first through (n−1)th adders, respectively, and for generating said plurality of carry signals;

and wherein said output sum comprises an integer part and a fraction part, and said first adder outputs another one of said plurality of carry signals having logic "1" representing a carry from a fraction part to an integer part during an addition by said first adder, said first through (n−1)th noncoincidence detecting means upon detecting noncoincidence outputting a carry signal of logic "1", and said means for generating an output dot pattern comprising an image size reduction data generator which comprises:

a reduced data generator which receives n-bit input dot pattern data and receives said plurality of carry signals from said first adder and said first through n−1)th noncoincidence detecting means, and said reduced data generator including means for ORing the input dot pattern data in accordance with occurrence of the carry signal of logic "1" from said first adder or said first through (n−1)th noncoincidence detecting means;

a number-of-carries encoding circuit for receiving the carry signals and generating a carry code representing the number of carry signals;

an output data register, connected to said reduced data generator and said number-of-carries encoding circuit for receiving the output data from said reduced data generator and for shifting said output data by the number of carry signals represented by the carry code from said number-of-carries encoding circuit;

a selector, connected to said output data register, for selecting succeeding n bits; and a zone position generator, responsive to said number-of-carries encoding circuit, for generating zone position information representing a zone position of n-bit data in said output data register to be selected by said selector, and which is defined by the code of the number of carry signals generated from said number-of-carries encoding circuit.

30. The image size converter according to claim 24, wherein said reduced data generator reduces input dot pattern data of not more than n bits by setting nonreduced dot data in said output data register and by ORing the nonreduced dot data and succeeding image size reduction object dot pattern data.

31. The image size converter according to claim 30, further comprising means for feeding back the nonreduced dot data set in said output data register to said reduced data generator.

32. The image size converter according to claim 29, wherein said output register comprises a barrel shifter.

33. An image size converter which receives input dot pattern data, for enlarging or reducing the image size of the input dot pattern data in accordance with a scale value, comprising:

means for inputting the scale value to the image size converter;

means for receiving the scale value from said inputting means and for generating in parallel a plurality of carry signals;

means for receiving in parallel said plurality of carry signals and the input dot pattern data and for producing output dot pattern data;

said means for generating a plurality of carry signals including:

means for generating predetermined multiples of the scale value;

first through nth adders, each of which receives predetermined ones of the multiples of the scale value at a first input thereof, n being an integer of 2 or more;

a register for holding an output sum from said nth adder and supplying the output sum to a second input of each of said first through nth adders, a content of said register being updated for each of predetermined sets of input dot pattern data;

first through (n−1)th noncoincidence detecting means, each connected between an adjacent two adders, for detecting noncoincidence between a least significant bit of each sum from said second through nth adders and of said first through (n−1)th adders, respectively, and for generating said plurality of carry signals;

and wherein said first adder outputs a carry signal of logic "1" representing a carry from a fraction part to an integer part during an addition by said first adder, said first through (n−1)th noncoincidence detecting means upon detecting noncoincidence outputting a carry signal of logic "1", and said means for producing output adopt pattern data comprising an image size reduction data generator which includes:

a reduced data generator which receives n-bit input dot pattern data and receives an addition result of said first adder and detection results of said first through (n−1)th noncoincidence detecting means in a one-to-one correspondence manner, and said reduced data generator thinning out the dot pattern data until detecting the carry signal of logic "1" from said first adder or said first through (n−1)th noncoincidence detecting means;

a number-of-carries encoding circuit for receiving the carry signals and generating a carry code representing the number of carry signals;

an output data register, connected to said reduced data generator and said number-of-carries encoding circuit for receiving the output data from said reduced data generator and for shifting said output data by the number of carry signals represented by the carry code from said number-of-carries encoding circuit;

a selector, connected to said output data register, for selecting succeeding n bits; and a zone position generator responsive to said number-of-carries encoding circuit, for generating zone position information which represents a zone position of n-bit data in said output data register to be selected by said selector, and which is defined by the code of the number of carry signals generated from said number-of-carries encoding circuit.

34. The image size converter according to claim 33, wherein said reduced data generator reduces input dot data of not more than n bits by setting nonreduced dot data in said output data register and by ORing the nonreduced dot data and succeeding image size reduction object dot pattern data.

35. The image size converter according to claim 34, further comprising means for feeding back the nonreduced dot data set in said output data register to said reduced data generator.

36. The image size converter according to claim 33, wherein said output register comprises a barrel shifter.

37. An image size converter which receives input dot pattern for enlarging or reducing the image size of the input dot pattern data in accordance with a scale value, comprising:

means for inputting the scale value to the image size converter;

means for receiving the scale value from said inputting means and for generating in parallel a plurality of carry signals;

said means for generating a plurality of carry signals comprising:

means for generating predetermined multiples of the scale value;

first through nth adders, each of which receives one of said predetermined multiples of the scale value at a first input thereof, n being an integer of 2 or more, said first adder outputting a carry signal of logic "1" representing a carry from a fraction part to an integer part during an addition by said first adder;

a register for holding an output sum from said nth adder and supplying the output to a second input of each of said first through nth adders, a content of said register being updated for each of predetermined sets of input dot pattern data;

first through (n−1)th noncoincidence detecting means, each connected between an adjacent two adders, for detecting noncoincidence between a least significant bit of each sum from said second through nth adders and of said first through (n−1)th adders, respectively, each of said first through (n−1)th noncoincidence detecting means outputting a carry signal of logic "1" upon detecting noncoincidence;

means for receiving in parallel said plurality of carry signals and the input dot pattern data and for producing output dot pattern data, said means for producing an output dot pattern comprising an image size enlargement data generator which includes:

an input register for receiving an n-bit image enlargement object dot data;

a selector, connected to said input register, for selecting succeeding n-bit data from said input register;

a number-of-carries encoding circuit for receiving the carry signals and generating a carry code representing a number of carry signals;

a zone position generator, connected to said selector, for generating zone position information which represents bit positions of n-bit data held in said input register to be selected by said selector, and which is defined by the code of the number of carry signals generated from said number-of-carries encoding circuit; and an enlargement data generator, connected to said selector, said first adder, and said first through (n−1)th noncoincidence detecting means, for coping the respective dots of the data output from said selector until detecting the carry signal of logic "1" from said first adder and said first through (n−1)th noncoincidence detecting means.

38. The image size converter according to claim 37, wherein said input register performs an n-bit shift function upon completion of enlargement processing of n-bit enlargement object dot data by said enlargement data generator.

39. An image converter which receives input dot pattern data for enlarging or reducing the image size in accordance with a scale value, comprising:

means for inputting the scale value to the image size converter;

means, connected to said inputting means, for receiving said scale value and for generating a plurality of carry signals, said means from generating a plurality of carry signals comprising:

means for generating predetermined multiples of the scale value;

first through nth adders each of which receives one of said multiples of the scale value at a first input, n being an integer of 2 or more;

a register for holding at least a fraction part of said nth adder and supplying the fraction part to said second input of each of said first through nth adders, a content of said register being updated for each of predetermined sets of input dot data; and first through (n−1)th noncoincidence detecting means, each connected between an adjacent two adders, for detecting noncoincidence between a least significant bit of each sum from said second through nth adders and of said first through (n−1)th adders, respectively, and for generating said plurality of carry signals;

means for receiving and processing the input dot pattern data and for generating output dot pattern data; and means, connected to said means for generating a plurality of carry signals and said means for generating the output dot pattern data, for controlling the processing of the image pattern data in response to parallel input of said carry signals to modify the output dot pattern data in accordance with the scale value.

40. An image size converter which receives input dot pattern data for enlarging or reducing an image size in accordance with a scale value, comprising:

means for inputting the scale value to the image size converter;

means, connected to said inputting means, for receiving said scale value and for generating in parallel a plurality of carry signals, said means for generating a plurality of carry signals comprising:

means for generating predetermined multiples of the scale value;

first through nth adders each of which receives one of said multiples of the scale value at a first input, n being an integer of 2 or more;

a register for holding an output from said nth adder and for supplying the output to a second input of each of said first through nth adders, a content of said register being updated for each of predetermined sets of input dot pattern data;

first through (n−1)th noncoincidence detecting means, each connected between an adjacent two adders, for detecting noncoincidence between a least significant bit of each sum from said second through nth adders and of said first through (n−1)th adders, respectively, and for generating said plurality of carry signals;

means for receiving and processing the input dot pattern data and for generating output dot pattern data, said means for generating output dot pattern data including means for performing a predetermined bit manipulation on the output dot pattern among the plurality of carry signals, the plurality of carry signals including a carry from a fraction part to an integer part in an addition by said first adder; and means, connected to said means for generating a plurality of carry signals and said means for outputting dot pattern data, for controlling the processing of the image pattern data in response to parallel input of said carry signals to modify the output dot pattern data in accordance with the scale value.

41. An image size converter which receives input dot pattern data for enlarging or reducing an image size in accordance with a scale value, comprising:

means for inputting the scale value to the image size converter;

means, operatively coupled to said inputting means, for receiving the scale value and for generating in parallel a plurality of carry signals, said means for generating a plurality of carry signals comprising:

means for generating predetermined multiples of the scale value;

first through nth adders each of which receives one of said predetermined multiples of the scale value at a first input, n being an integer of 2 or more;

a register for holding an output from said nth adder and for supplying the output to a second input of each of said first through nth adders, a content of said register being updated for each of predetermined sets of input dot pattern data;

a first noncoincidence detecting means for detecting noncoincidence between at least a least significant bit of an integer part of a sum from said first adder and the contents of said register;

second through nth noncoincidence detecting means, each connected between an adjacent two adders, for detecting noncoincidence between at least the least significant bits of integer parts of the respective sums from said first second through nth adders and of said first through (n−1)th adders, respectively;

means for receiving and processing the input dot pattern data and for generating output dot pattern data; and means, operatively coupled to receive said carry signals and said output dot pattern data, for controlling the processing of the image pattern data in response to parallel input of said carry signals to modify the output dot pattern data in accordance with the scale value.

42. An image size converter which receives input dot pattern data from enlarging or reducing the image size in accordance with a scale value, comprising:
   means for inputting the scale value to the image size converter;
   means, operatively coupled to said inputting means, for receiving said scale value and for generating in parallel a plurality of carry signals, said means for generating a plurality of carry signals comprising:
   means for generating predetermined multiples of the scale value;
   first through nth adders each of which receives one of said predetermined multiples of the scale value at a first input, n being an integer of 2 or more, said first adder outputting a carry signal of logic "1" representing a carry from a fraction part to an integer part during an addition by said first adder;
   a register for holding an output from said nth adder and for supplying the output to a second input of each of said first through nth adders, a content of said register being updated for each of predetermined sets of input dot pattern data;
   first through (n−1)th noncoincidence detecting means, each connected between an adjacent two adders, for detecting noncoincidence between least significant bits of integer parts of the respective sums from said second through nth adders and of said first through (n−1)th adders;
   said first through (n−1)th noncoincidence detecting means upon detecting noncoincidence outputting a carry signal of logic "1";
   means for receiving and processing the input dot pattern data and for generating output dot pattern data, said means for generating output dot pattern data comprising an image size reduction data generator including:
   a reduced data generator which receives n-bit input dot pattern data and receives an addition result of said first adder and detection results of said first through (n−1)th noncoincidence detecting means in a one-to-one correspondence manner, and said reduced data generator including means for ORing the input dot pattern data in accordance with occurrence of the carry signal of logic "1" from said first adder or first through (n−1)th noncoincidence detecting means; and
   means for controlling the processing of the image pattern data in response to parallel input of said carry signals to modify the output dot pattern data in accordance with the scale value, said means for controlling the processing of the image pattern comprising:
   a number-of-carries encoding circuit for receiving the carry signals and generating a carry code representing the number of carry signals;
   an output data register, connected to said reduced data generator and said number-of-carries encoding circuit, for receiving output data from said reduced data generator and for shifting said output data by the number of carry signals represented by the carry code from said number-of-carries encoding circuit;
   a selector, connected to said output data register, for selecting succeeding n bits; and
   a zone position generator, connected to said number-of-carries encoding circuit, for generating zone position information representing a zone position of n-bit data to be selected by said selector, and which is defined by the code of the number of carry signals generated from said number-of-carries encoding circuit.

43. The image size converter according to claim 42, wherein said reduced data generator reduces input dot data of not more than n bits by setting nonreduced dot data is said output data register and by ORing the nonreduced dot data and succeeding image size reduction object dot pattern data.

44. The image size converter according to claim 43, further comprising means for feeding back the nonreduced dot data set in said output data register to said reduced data generator.

45. The image size converter according to claim 42, wherein said output register comprises a barrel shifter.

46. An image size converter which receives input dot pattern data for enlarging or reducing the image size in accordance with a scale value, comprising:
   means for inputting the scale value to the image size converter;
   means, operatively coupled to said inputting means, for receiving said scale value and for generating in parallel a plurality of carry signals, said means for generating a plurality of carry signals comprising:
   means for generating predetermined multiples of the scale value;
   first through nth adders each of which receives one of said predetermined multiples of the scale value at a first input, n being an integer of 2 or more, said first adder outputting a carry of logic "1" representing a carry from a fraction part to an integer part during an addition by said first adder;
   a register for holding an output from said nth adder and for supplying the output to a second input of each of said first through nth adders, a content of said register being updated for each of predetermined sets of input dot pattern data; and
   first through (n−1)th noncoincidence detecting means, each connected between an adjacent two adders, for detecting noncoincidence between a least significant bit of each sum from said second through nth adders and of said first through (n−1)th adders, respectively, and for outputting a carry signal of logic "1" upon detecting noncoincidence;
   means for receiving and processing the input dot pattern data and for generating output dot pattern data, said means for generating output dot pattern data comprising an image size reduction data generator which includes:
   a reduced data generator which receives a pattern input of n bits and receives an addition result of said first adder and detection results of said first through (n−1)th noncoincidence detecting means in a one-to-one correspondence manner, and said reduced data generator thinning out the input dot pattern data until detecting the carry signal of logic "1" from said first adder or said first through (n−1)th noncoincidence detecting means; and
   means for controlling the processing of the image pattern data in response to parallel input of said carry signals to modify the output dot pattern data in accordance with the scale value, said means for controlling the processing of the image pattern data comprising:

a number-of-carries encoding circuit for receiving the carry signals and generating a carry code representing the number of carry signals;

an output data register, connected to said reduced data generator and said number-of-carries encoding circuit, for receiving output data from said reduced data generator and for shifting said output data by the number of carry signals represented by the carry code from the number-of-carries encoding circuit;

a selector, connected to said output data register, for selecting succeeding n bits; and a zone position generator, connected to said number-of-carries encoding circuit, for generating zone position information representing a zone position of n-bit data in said output data register to be selected by said selector, and which is defined by the code of the number of carry signals generated from said number-of-carries encoding circuit.

47. The image size converter according to claim 46, wherein said reduced data generator reduces input dot pattern data of not more than n bits by setting nonreduced dot data in said output data register and by ORing the nonreduced dot data and succeeding image size reduction object dot pattern data.

48. The image size converter according to claim 47, further comprising means for feeding back the nonreduced dot data set in said output data register to said reduced data generator.

49. An image size converter according to claim 46, wherein said output register comprises a barrel shifter.

50. An image size converter which receives input dot pattern data for enlarging or reducing the image size in accordance with a scale value, comprising:

means for inputting the scale value to the image size converter;

means, operatively coupled to said inputting means, for receiving the scale value and for generating in parallel a plurality of carry signals, said means for generating a plurality of carry signals comprising:

means for generating predetermined multiples of the scale value;

first through nth adders each of which receives one of said predetermined multiples of the scale value at a first input, said first adder outputting a carry signal of logic "1" representing a carry from a fraction part to an integer part during an addition by said first adder;

a register for holding an output from said nth adder and for supplying the output to a second input of each of said first through nth adders, a content of said register being updated for each of predetermined sets of input dot pattern data; and first through (n−1)th noncoincidence detecting means, each connected between an adjacent two adders, for detecting noncoincidence between a least significant bit of each sum from said second through nth adders and of said first through (n−1)th adders, respectively, each of said first through (n−1)th noncoincidence detecting means outputting a carry signal of logic "1" upon detecting noncoincidence;

means for receiving and processing the input dot pattern data and for generating output dot pattern data, said means for generating output dot pattern data comprising an image size enlargement data generator which includes:

an input register for receiving n-bit image enlargement object dot data;

a selector, connected to said input register, for selecting succeeding n-bit data from said input register; and an enlargement data generator, connected to said selector, said first adder, and said first through (n−1)th noncoincidence detecting means, for copying the respective dots of the data output from said selector until detecting the carry signal of logic "1" from said first adder and said first through (n−1)th noncoincidence detecting means; and means for controlling the processing of the image pattern data in response to parallel input of said carry signals to modify the output dot pattern data in accordance with the scale value, said means for controlling comprising:

a number-of-carries encoding circuit for receiving the carry signals and generating a carry code representing a number of carry signals; and a zone position generator, connected to said selector, for generating zone position information which represents bit positions of n-bit data held in said input register to be selected by said selector, and which is defined by the code of the number of carry signals generated from said number-of-carries encoding circuit.

51. The image size converter according to claim 50, wherein said input register performs an n-bit shift function upon completion of enlargement processing of n-bit enlargement object dot data by said enlargement data generator.

* * * * *